US012297877B2

(12) United States Patent
Kittaka et al.

(10) Patent No.: US 12,297,877 B2
(45) Date of Patent: May 13, 2025

(54) CONTROL DEVICE

(71) Applicant: HONDA MOTOR CO., LTD., Tokyo (JP)

(72) Inventors: Eiji Kittaka, Tokyo (JP); Yasushi Fujimoto, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/825,327

(22) Filed: Sep. 5, 2024

(65) Prior Publication Data
US 2024/0426352 A1    Dec. 26, 2024

Related U.S. Application Data

(63) Continuation of application No. PCT/JP2022/010330, filed on Mar. 9, 2022.

(51) Int. Cl.
*F16D 48/06* (2006.01)

(52) U.S. Cl.
CPC ......... *F16D 48/064* (2013.01); *F16D 48/068* (2013.01); *F16D 2300/18* (2013.01); *F16D 2500/1117* (2013.01); *F16D 2500/50203* (2013.01)

(58) Field of Classification Search
CPC ......... F16D 2500/50203; F16D 48/064; F16D 48/068; F16D 2500/1082; F16D 2500/1083; F16D 2300/18
See application file for complete search history.

(56) References Cited

U.S. PATENT DOCUMENTS

| 8,360,930 B2 | 1/2013 | Kobayashi et al. |
| 2009/0211870 A1 | 8/2009 | Hayakawa et al. |
| (Continued) | | |

FOREIGN PATENT DOCUMENTS

| JP | 2006-170228 A | 6/2006 |
| JP | 2014-70686 A | 4/2014 |
| WO | 2020/213333 A1 | 10/2020 |

OTHER PUBLICATIONS

International Search Report dated May 24, 2022, issued in counterpart International Application No. PCT/JP2022/010330, with English Translation. (5 pages).

(Continued)

*Primary Examiner* — Timothy Hannon
(74) *Attorney, Agent, or Firm* — WHDA, LLP

(57) ABSTRACT

A control device includes a connecting member connected to a release operation member of a clutch device, an electric actuator for displacing the release operation member through the connecting member, a control unit configured to displace the release operation member by driving the electric actuator so as to change a clutch capacity of the clutch device, a first sensor configured to detect an operation amount of the electric actuator with respect to the connecting member, and a second sensor configured to detect a displacement amount of the release operation member. The control unit is configured to determine whether or not there is an intervention of the manual operation by the operator through the clutch operating element based on each detection result of the first sensor and the second sensor during an automatic control of the clutch device by the electric actuator.

10 Claims, 15 Drawing Sheets

(56) References Cited

U.S. PATENT DOCUMENTS

2010/0298094 A1* 11/2010 Oda .................. F16D 48/064
477/179
2021/0277966 A1* 9/2021 Matsuura ............ F16D 48/08

OTHER PUBLICATIONS

Written Opinion of the International Searching Authority (Form PCT/ISA/237) dated May 24, 2022, issued in counterpart International Application No. PCT/JP2022/010330. (3 pages).
Extended (Supplementary) European Search Report dated Feb. 27, 2025, issued in counterpart EP Application No. 22930813.5. (7 pages).

\* cited by examiner

CONTROL DEVICE

CROSS-REFERENCE TO RELATED APPLICATION(S)

This application is a Continuation of International Patent Application No. PCT/JP2022/010330, filed Mar. 9, 2022, the entire disclosure of which is incorporated herein by reference.

BACKGROUND OF THE INVENTION

Field of the Invention

The present invention relates to a technology for controlling a clutch device.

Description of the Related Art

A technology for automatically connecting and disconnecting a clutch device has been proposed. Japanese Patent Laid-Open No. 2006-170228 discloses a device capable of automatically controlling a clutch device that connects and disconnects transmission of an output of a prime mover (engine) of a straddle type vehicle.

In the conventional device, there is room for an improvement in terms of structural complexity that causes an increase in cost.

SUMMARY OF THE INVENTION

An object of the present invention is to provide a control device capable of realizing an automatic control of a clutch device with a relatively simple configuration.

According to an aspect of the present invention, there is provided a control device for automatically controlling a clutch device disposed on a path along which a driving force output from a prime mover is transmitted, the clutch device being configured to connect or disconnect transmission of the driving force according to a manual operation of an operator with respect to a clutch operating element, the control device comprising: a connecting member connected to a release operation member of the clutch device; an electric actuator configured to displace the release operation member through the connecting member; a control unit configured to displace the release operation member by driving the electric actuator so as to change a clutch capacity of the clutch device; a first sensor configured to detect an operation amount of the electric actuator with respect to the connecting member; and a second sensor configured to detect a displacement amount of the release operation member, wherein the control unit is configured to determine whether or not there is an intervention of the manual operation by the operator through the clutch operating element based on each detection result of the first sensor and the second sensor during an automatic control of the clutch device by the electric actuator.

Further features of the present invention will become apparent from the following description of exemplary embodiments (with reference to the attached drawings).

DESCRIPTION OF THE EMBODIMENTS

Figure 1:
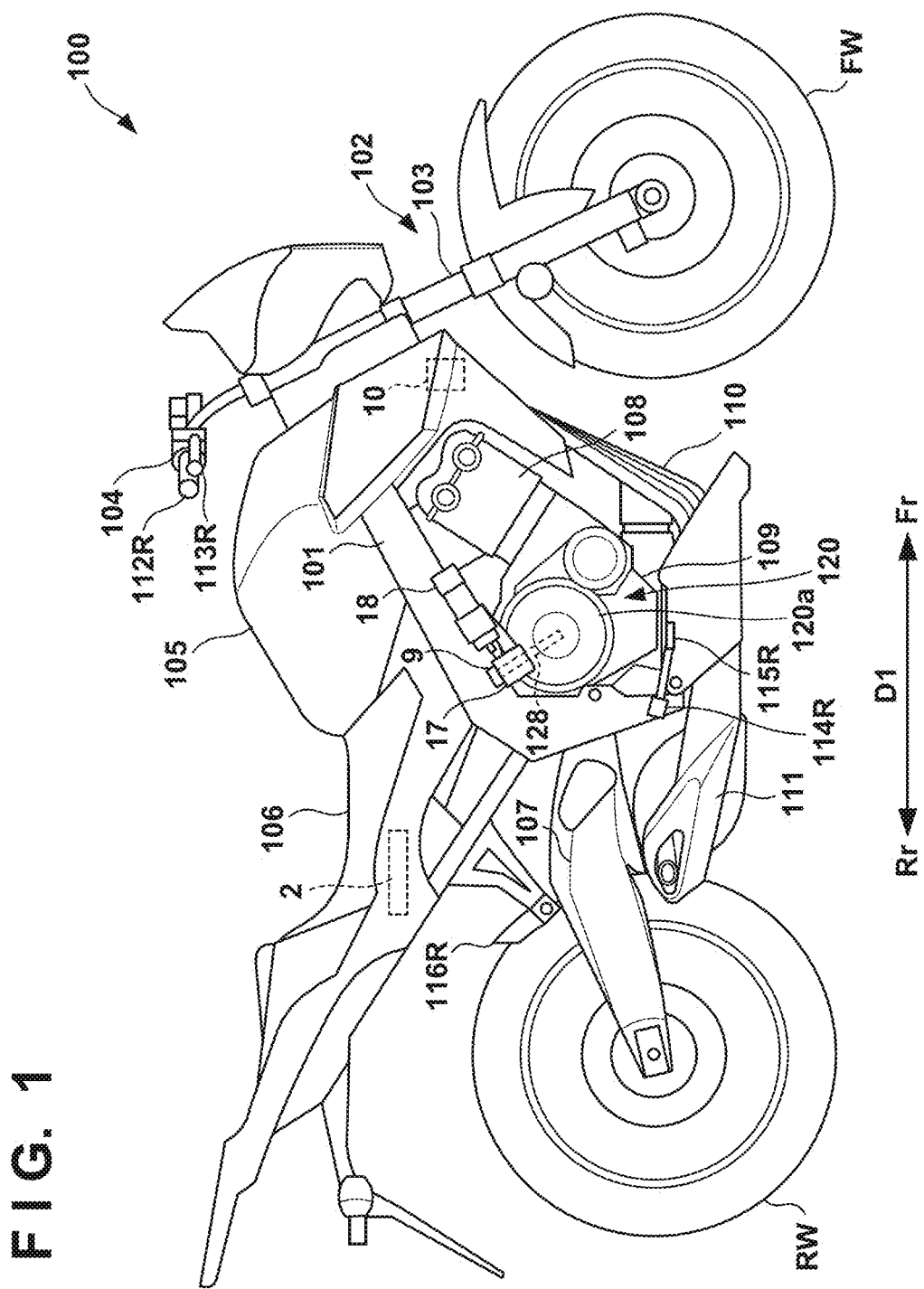
FIG. 1 is a side view of a straddle type vehicle.

Hereinafter, embodiments will be described in detail with reference to the attached drawings. Note that the following embodiments are not intended to limit the scope of the claimed invention, and limitation is not made to an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

<Outline of Straddle Type Vehicle>

Figure 2:
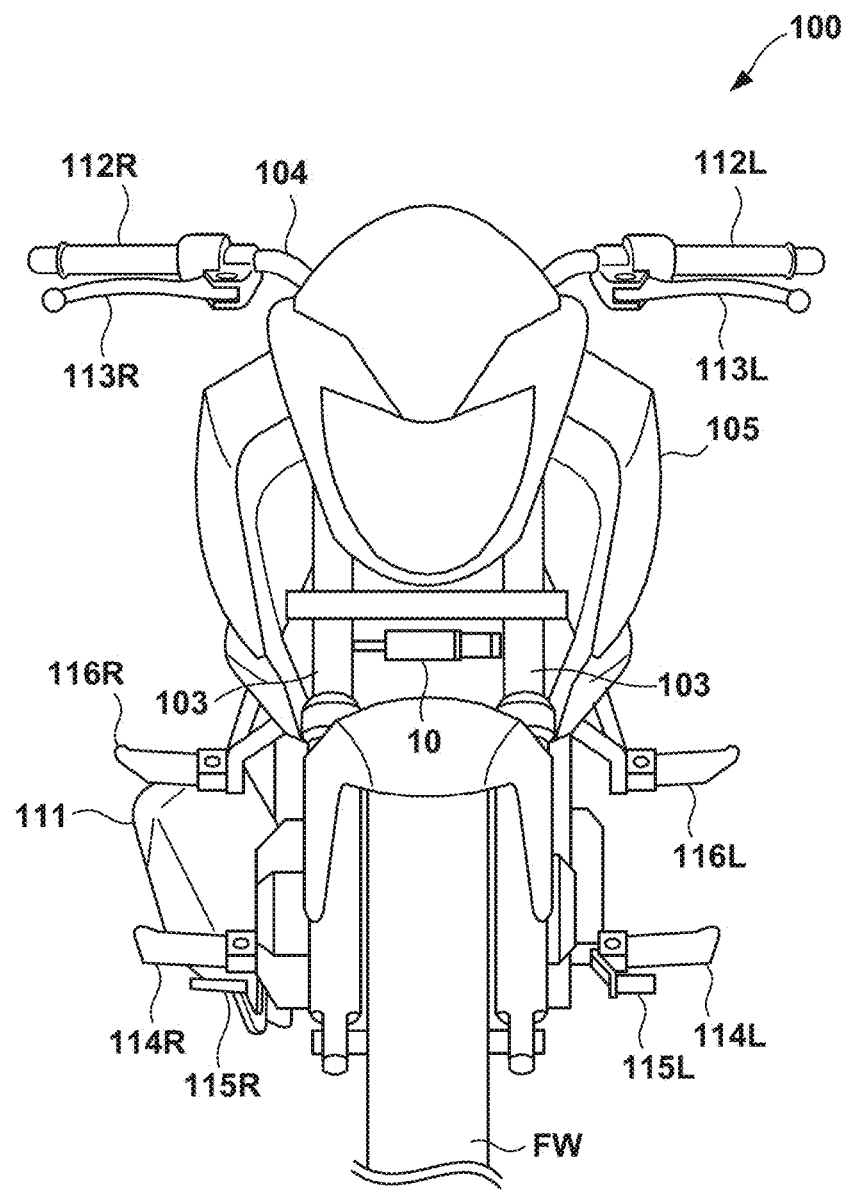
FIG. 2 is a front view of the straddle type vehicle of FIG. 1.

FIGS. 1 and 2 are a side view and a front view of a straddle type vehicle (hereinafter, simply referred to as a vehicle) 100. The vehicle 100 is a motorcycle including one front wheel FW and one rear wheel RW. In the drawing, an arrow D1 indicates a front-and-rear direction of the vehicle 100, and an arrow D2 indicates a width direction (a left-and-right direction). Fr represents a front side, and Rr represents a rear side. R represents a right side at the time of forward movement, and L represents a left side at the time of forward movement.

The vehicle 100 includes a vehicle body frame 101, which forms its skeleton. A front wheel steering unit 102 is supported at a front end of the vehicle body frame 101, and a swing arm 107 is swingably supported at a rear end of the vehicle body frame 101. The front wheel steering unit 102 includes a pair of left and right front forks 103 supporting the front wheel FW, and a steering handle 104 attached to an upper portion of the pair of front forks 103.

A right grip 112R of the steering handle 104 is an operating element (an accelerator grip) with which a rider is able to instruct the vehicle 100 to accelerate. An operating element (a brake lever) 113R that receives a braking operation of the rider with respect to the front wheel FW is rotatably provided adjacent to the right grip 112R. An operating element (a clutch lever) 113L that receives a connecting/disconnecting operation of the rider with respect to a clutch device 120 is rotatably provided adjacent to a left grip 112L of the steering handle 104.

A front end of the swing arm 107 is swingably supported by the vehicle body frame 101, and the rear wheel RW is supported by a rear end of the swing arm 107. A prime mover 108 and a transmission 109 are supported by the vehicle body frame 101 in a region between the front wheel FW and the rear wheel RW. In the present embodiment, the prime mover 108 is an internal combustion engine, and is particularly a parallel four-cylinder four-stroke DOHC water-cooled engine. Exhaust gas of the prime mover 108 is discharged through an exhaust passage including an exhaust pipe 110 and a muffler 111.

The clutch device 120 is disposed on a path along which a driving force output from the prime mover 108 is transmitted. In the present embodiment, the clutch device 120 is disposed between the prime mover 108 and the transmission 109, and connects and disconnects the transmission of the driving force of the prime mover 108 to and from the transmission 109.

The driving force of the prime mover 108 is transmitted to the rear wheel RW through the transmission 109 and a chain transmission mechanism (not illustrated). A fuel tank 105 is disposed above the prime mover 108, and a seat 106 on which the rider is to be seated is disposed behind the fuel tank 105.

The transmission 109 is a manual and constant-mesh type transmission that changes the output of the prime mover 108. The transmission 109 is switched between a plurality of gear ratios (for example, 1st-speed to 6th-speed gear ratios) and neutral according to a shift operation of the rider with respect to an operating element 115L (a gear change pedal). The operating element 115L is provided adjacent to a left step 114L so as to be operable by the rider. The rider can place his/her left foot on the left step 114L and operate the operating element 115L with the left foot.

An operating element 115R is a brake pedal provided adjacent to a right step 114R so as to be operable by the rider. The rider can perform an operation of braking the rear wheel RW by placing his/her right foot on the right step 114R and operating the operating element 115R with the right foot. Steps 116R and 116L are steps for a passenger.

In the present embodiment, the clutch device 120 is a wet multi-plate coil spring type clutch, and connection and disconnection thereof are automated by an electric actuator 10. The electric actuator 10 is disposed behind the front wheel steering unit 102 in a front portion of the vehicle 100. A control unit 2 is disposed below the seat 106. The control unit 2 controls the electric actuator 10, etc.

<Control Device>

Figure 3:
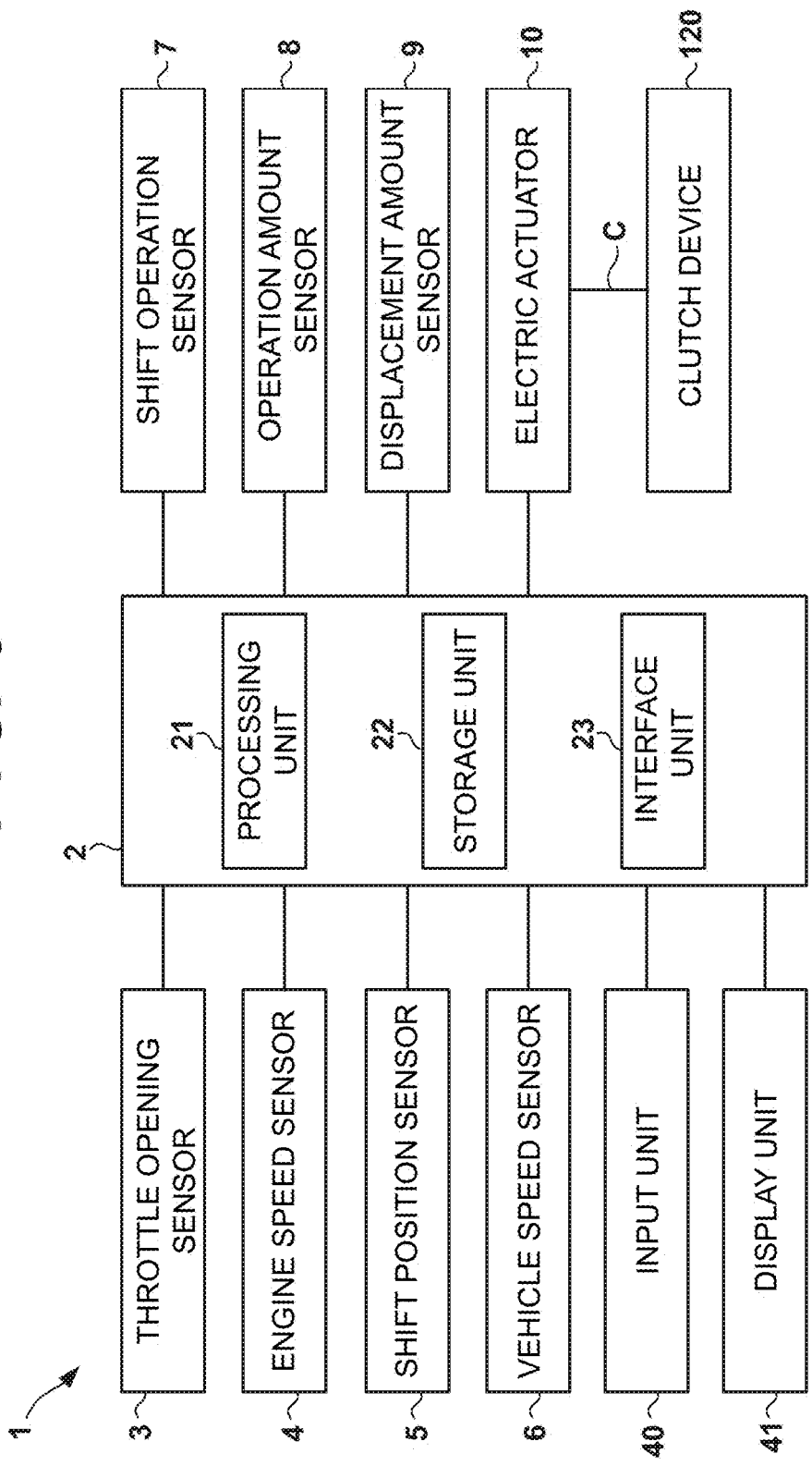
FIG. 3 is a block diagram of a control device.

FIG. 3 is a block diagram of a control device 1 that controls the clutch device 120. The control device 1 includes the control unit 2. The control unit 2 includes a processing unit 21, a storage unit 22, and an interface unit 23. The processing unit 21 is a processor represented by a CPU, and executes a program stored in the storage unit 22. The storage unit 22 is a storage device such as a semiconductor memory, and stores a program to be executed by the processing unit 21, data to be used for processing, and the like. The interface unit 23 inputs and outputs data to and from the processing unit 21 and a device outside the control unit 2. As will be described below, the processing unit 21 drives the electric actuator 10 on the basis of detection results of various sensors 3 to 9, and executes a control to change a clutch capacity of the clutch device 120.

A throttle opening sensor 3 is a sensor that detects a degree to which a throttle valve that adjusts an inflow amount of air into each combustion chamber of the prime mover 108 is open, and is, for example, a rotary encoder that detects a rotation amount of a throttle shaft. An engine speed sensor 4 is a sensor that detects a speed of the prime mover 108, and is, for example, a magnetic crank angle sensor that detects a crank angle of the prime mover 108.

A shift position sensor 5 is a sensor that detects a state (for example, one of 1st to 6th gears or neutral) of the transmission 109, and is, for example, a sensor that detects a rotation angle of a shift drum (not illustrated) of the transmission 109. A vehicle speed sensor 6 is a sensor that detects a vehicle speed of the vehicle 100, and is, for example, a sensor that detects a rotation amount of the front wheel FW. A shift operation sensor 7 is a sensor that detects a shift operation of the rider with respect to the operating element 115L, and is, for example, a torque sensor that detects a load acting on a rotation center axis of the operating element 115L.

An input unit 40 is a device that receives an input from the rider, and is, for example, a switch, a touch panel, or the like. The rider can input a selection of various settings and the like from the input unit 40, and accordingly, the processing unit 21 of the control unit 2 recognizes the rider's selection and the like. A display unit 41 is a device that displays information to the rider, and is, for example, an indicator such as an LED, a liquid crystal display device, or the like. The input unit 40 and the display unit 41 can be mounted on, for example, the handle 104.

Figure 4:
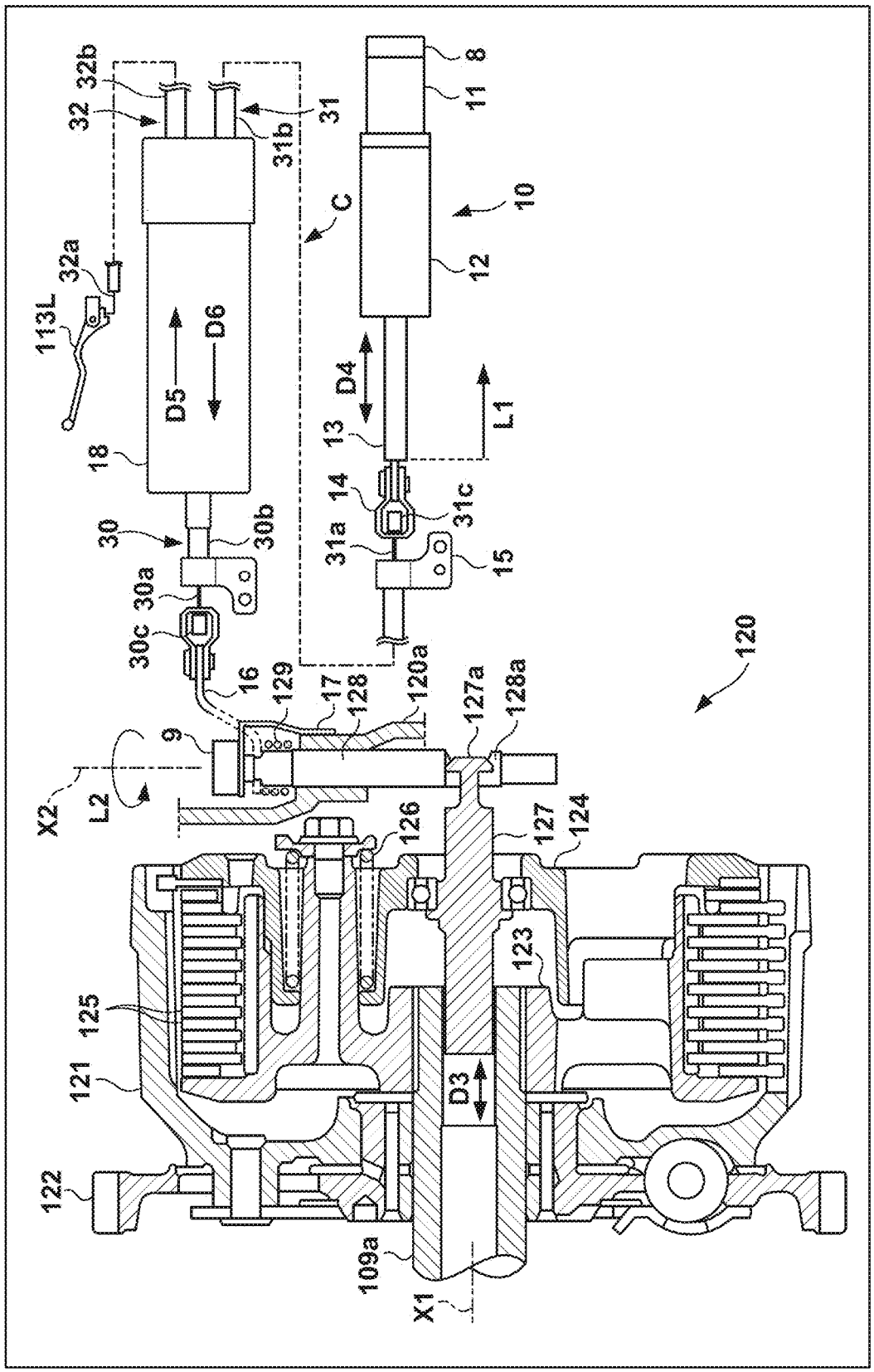
FIG. 4 is an explanatory view of a clutch device and a related configuration.
Figure 5:
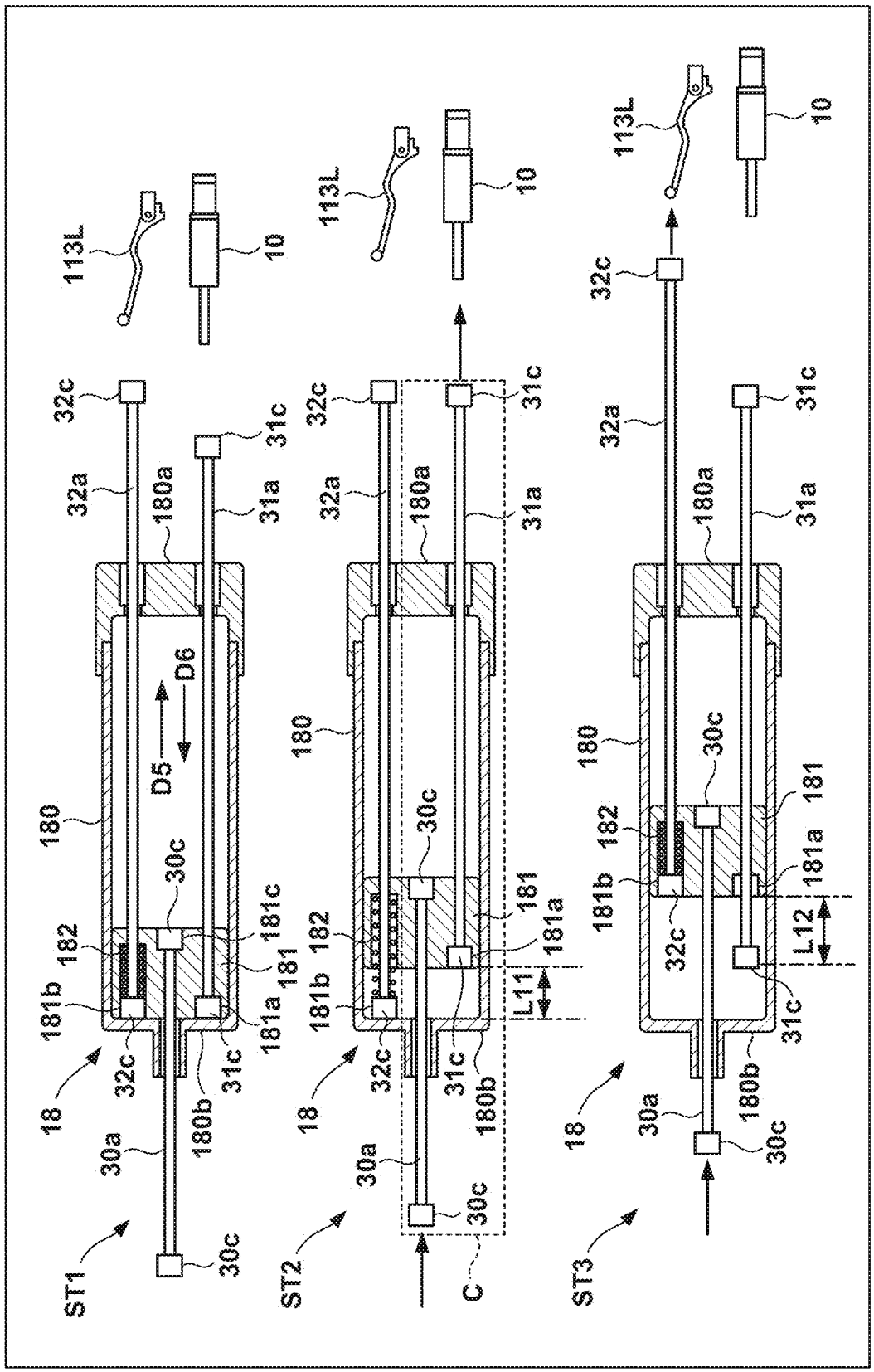
FIG. 5 is an explanatory view of an operation of a transmission mechanism.

Here, an operation amount sensor 8, a displacement amount sensor 9, an electric actuator 10, and a transmission mechanism 18 will be described with reference to FIGS. 4 and 5 in addition to FIG. 3. FIG. 4 is an explanatory view of the clutch device 120 and a related configuration. FIG. 5 is an explanatory view of an operation of the transmission mechanism 18.

The clutch device 120 includes an input gear 122 to which a driving force of the prime mover 108 is input from a crankshaft (not illustrated) of the prime mover 108. A clutch outer 121 rotates integrally with the input gear 122 around a rotation center line X1. The rotation center line X1 is a rotation center line (axis) of a main shaft 109a of the transmission 109. The main shaft 109a is coupled to the clutch center 123 and rotates integrally with the clutch center 123. A plurality of disk-shaped clutch plates 125 are stacked in the direction of the rotation center line X1 between the clutch outer 121 and the clutch center 123.

In the plurality of clutch plates 125, clutch plates that rotate integrally with the clutch outer 121 and clutch plates that rotate integrally with the clutch center 123 are alternately arranged in the stacking direction, and the drive transmission between the clutch outer 121 and the clutch center 123, that is, the transmission of the driving force of the prime mover 108 to the transmission 109, is performed by frictional engagement between the plurality of clutch plates 125.

The plurality of clutch plates 125 are pressed in the stacking direction by a biasing force of a clutch spring 126 through a pressure plate 124 and frictionally engaged with each other. A plurality of clutch springs 126 is disposed around the rotation center line X1.

The clutch device 120 includes a lifter shaft 127 and a release operation member 128 as a release mechanism. An end portion of the lifter shaft 127 is inserted into the cylindrical main shaft 109a, and the lifter shaft 127 is provided to be movable in a reciprocating manner together with the pressure plate 124 in a D3 direction, which is a direction of the rotation center line X1. The release operation member 128 is a shaft member extending in a direction orthogonal to the axial direction (the D3 direction) of the lifter shaft 127, and is a member for blocking the drive transmission of the clutch device 120 by an external input.

The release operation member 128 is supported by a clutch cover 120a so as to be rotatable about an axis thereof (about a rotation center line X2), and an upper end thereof is exposed to the outside of the clutch cover 120a. The release operation member 128 has an eccentric cam portion 128a. The eccentric cam portion 128a is engaged with an engagement portion 127a at an end portion of the lifter shaft 127 inside the clutch cover 120a. When the release operation member 128 is rotated in a predetermined direction, the lifter shaft 127 is moved, due to the engagement between the eccentric cam portion 128a and the engagement portion 127a, in a direction (the right side of the D3 direction in FIG. 4) in which the frictional engagement between the plurality of clutch plates 125 is released. A rotation amount (an operation angle) of the release operation member 128 and a movement amount of the lifter shaft 127 in the D3 direction are proportional to each other. The rotation of the release operation member 128 changes a frictional engagement force between the plurality of clutch plates 125 to change a clutch capacity of the clutch device 120, and block the drive transmission.

An arm member 16 is fixed to an upper end portion of the release operation member 128. The arm member 16 is a lever member protruding in a radial direction of the release operation member 128, with one end thereof being fixed to the release operation member 128, and the other end thereof being connected to an inner cable 30a of a cable 30 through a holder 14. A return spring 129 that biases the release operation member 128 to an initial position is provided between the arm member 16 and the clutch cover 120a.

The inner cable 30a is connected to the operating element 113L and the electric actuator 10 through the transmission mechanism 18. In the present embodiment, the release operation member 128 can be operated both manually by the rider through the operating element 113L and automatically by the electric actuator 10. In other words, in the vehicle 100, the drive transmission through the clutch device 120 can be connected or disconnected according to a manual operation of the rider with respect to the operating element 113L, and can be automatically controlled using the electric actuator 10.

In the present embodiment, the electric actuator 10 is an electric cylinder in which a rod 13 moves in a reciprocating manner in a D4 direction. The electric actuator 10 includes a drive source 11 that is an electric motor, and a conversion mechanism unit 12 that converts a rotational motion of an output shaft of the drive source 11 into a linear motion of the rod 13. The conversion mechanism unit 12 incorporates, for example, a conversion mechanism such as a ball screw mechanism or a feed screw mechanism. An inner cable 31a is connected to the rod 13 through a holder 14.

When the inner cable 31a is pulled by driving the electric actuator 10, the operation input is transmitted to the release operation member 128 through the transmission mechanism, and the release operation member 128 is rotated so that a clutch capacity of the clutch device 120 can be reduced. Conversely, when the inner cable 31a is returned (sent back), the release operation member 128 returns to its initial position due to the biasing of the clutch spring 126, so that the clutch capacity increases. To this end, the control unit 2 can control the drive source 11, thereby driving the electric actuator 10 to displace (rotate) the release operation member 128 and change the clutch capacity of the clutch device 120.

In the present embodiment, the electric cylinder is exemplified as the electric actuator 10, but the electric actuator 10 is not limited thereto. For example, the electric actuator 10 may be an electric drum including a drum capable of winding and rewinding the inner cable 31a or the like.

The transmission mechanism 18 is a mechanism that transmits an operation input of the operating element 113L or the electric actuator 10 to the release operation member 128, and is also a cancellation mechanism that cancels an overlapping operation between a manual operation through the operating element 113L and an operation by the electric actuator 10 with respect to the release operation member 128. Hereinafter, the transmission mechanism 18 and its peripheral structure will be described.

A cable 30 is disposed between the transmission mechanism 18 and the release operation member 128, a cable 31 is disposed between the transmission mechanism 18 and the electric actuator 10, and a cable 32 is disposed between the transmission mechanism 18 and the operating element 113L. The cables 30 to 32, each being entirely bendable with flexibility, include inner cables 30a to 32a and outer cables 30b to 32b through which the inner cables 30a to 32a are inserted.

The inner cables 30a to 32a are made of an elastically deformable wire materials, and are, for example, metal wires. Cylindrical engagement portions 30c to 32c are fixed to both end portions of the inner cables 30a to 32a, respectively. The engagement portions 30c and 31c of the inner cables 30a and 31a are engaged with the holders 14 on one side. The outer cables 30b to 32b are bendable tubes with flexibility, and end portions of the outer cables 30b and 31b are held by respectively corresponding catchers 15.

The transmission mechanism 18 includes a movable element 181 and a cylindrical support member 180 that supports the movable element 181 so as to be movable in a reciprocating manner. The support member 180 is a case member forming an outer wall of the transmission mechanism 18. The inner cables 31a and 32a are inserted through one end (an input side end) 180a in a longitudinal direction of the support member 180 and introduced into the support member 180, and the inner cable 30a is inserted through the other end (an output side end) 180b in the longitudinal direction of the support member 180 and introduced into the support member 180.

The movable element 181 can move in a reciprocating manner in a D5 direction and a D6 direction opposite to the D5 direction. The direction D5 is a rotation direction of the release operation member 128 and corresponds to a direction in which the torque capacity of the clutch device 120 is decreased, and the direction D6 is a rotation direction of the release operation member 128 and corresponds to a direction in which the torque capacity of the clutch device 120 is increased.

Engagement grooves 181a and 181b are formed in an end portion of the movable element 181 on the other end 180b side. The engagement grooves 181a and 181b are grooves each having a depth in a direction in which the movable element 181 moves in a reciprocating manner. The inner cable 31a is inserted through the movable element 181, and the engagement portion 31c thereof is engaged with the engagement groove 181a in the D5 direction and is not engaged with the engagement groove 181a in the D6 direction. The inner cable 32a is inserted through the movable element 181, and the engagement portion 32c thereof is engaged with the engagement groove 181b in the D5 direction and is not engaged with the engagement groove 181b in the D6 direction. The engagement groove 181b is a groove deeper than the engagement groove 181a, and an elastic member 182 is loaded between the bottom of the groove and the engagement portion 32c. In the present embodiment, the elastic member 182 is a coil spring.

An engagement groove 181c is also formed in an end portion of the movable element 181 on the one end 180a side. The engagement groove 181c is a groove having a depth in a direction in which the movable element 181 moves in a reciprocating manner. The inner cable 30a is inserted through the movable element 181, and the engagement portion 30c thereof is engaged with the engagement groove 181c in the D6 direction and is not engaged with the engagement groove 181c in the D5 direction.

An operation of the transmission mechanism 18 having the above-described configuration will be described with reference to FIG. 5. A state ST1 in FIG. 5 indicates an initial state. The movable element 181 is located on the other end 180b side of the support member 180. In this state, the release operation member 128 is located at an initial position, and the clutch device 120 is in a connected state. In addition, in this state, the electric actuator 10 does not pull the inner cable 31a, and there is no operation input to the operating element 113L. When the electric actuator 10 is driven from this state, as shown in a state ST2, the inner cable 31a, the support member 180, and the inner cable 30a serve as a connecting member C that connects the electric actuator 10 and the release operation member 128 to rotate the release operation member 128 from the initial position. In the illustrated example, the movable element 181 moves by a distance L11.

Since there is no operation input to the operating element 113L, the engagement portion 32c of the inner cable 32a remains at the position of the state ST1, and comes out of the engagement groove 181b. In particular, in the present embodiment, the engagement portion 32c is biased to the position of the state ST1 by the elastic member 182. This makes it possible to maintain the tension of the inner cable 32a, such that the operating element 113L is biased to a position (initial position) where there is no operation input, thereby suppressing the rattling of the operating element 113L.

In the state ST2, even if the operating element 113L is operated, the movable element 181 does not move within a range in which the engagement portion 32c moves by the distance L11, and therefore, the operation is invalid. In other words, in the state ST2, a displacement amount of the release operation member 128 corresponding to the distance L11 has already occurred by operating the electric actuator 10, and the operation on the operating element 113L overlapping the operation of the electric actuator 10 has been canceled.

A state ST3 illustrates a case where there is an operation input of the rider to the operating element 113L from the state ST2. In the illustrated example, the movable element 181 further moves by a distance L12, and the release operation member 128 is displaced by the distance L12. Since there is no operation input of the electric actuator 10, the engagement portion 31c of the inner cable 31a remains at the position of the state ST2 and comes out of the engagement groove 181a. In the state ST3, even if the electric actuator 10 is driven, the movable element 181 does not move within a range in which the engagement portion 31c moves by the distance L12, and therefore, the operation is invalid. In other words, in the state ST3, a displacement amount of the release operation member 128 corresponding to the distance L12 has already occurred by operating the operating element 113L, and the operation of the electric actuator 10 overlapping with the operation of the operating element 113L has been canceled.

By providing such a cancellation mechanism, the operation input to the operating element 113L and the operation input by the electric actuator 10 are not weighted, making it possible to avoid doubling the displacement amount of the release operation member 128.

Next, the operation amount sensor 8 is a sensor that detects an operation amount of the electric actuator 10 with respect to the connecting member C (more specifically, the inner cable 31a), and is a rotary encoder that detects a rotation amount of the drive source 11 in the present embodiment. In the present embodiment, a detection result of the operation amount sensor 8 is converted into a movement amount of the rod 13 in the D4 direction, which is set as an operation amount L1 of the electric actuator 10 with respect to the connecting member C. In other words, the operation amount L1 is a movement amount of an end of the connecting member C on the electric actuator 10 side. In the example of FIG. 4, a movement amount in a direction in which the rod 13 is retracted from an initial position (a maximum protruding position) of the rod 13 is set as the operation amount L1.

The displacement amount sensor 9 is a sensor that detects a displacement amount of the release operation member 128. In the present embodiment, the displacement amount sensor 9 is an angle sensor that detects a rotation amount (an operation angle) of the release operation member 128 about the rotation center line X2 as the displacement amount of the release operation member 128. The displacement amount sensor 9 is supported by the clutch cover 120a through a bracket 17, and an upper end of the release operation member 128 is connected to the displacement amount sensor 9. In the present embodiment, the transmission mechanism 18 is also supported by the clutch cover 120a through the bracket 17. Since the displacement amount sensor 9 and the transmission mechanism 18 are supported by the single bracket 17, the number of parts can be reduced.

<Automatic Control of Clutch Capacity>

In the present embodiment, regarding the connection and disconnection of the clutch device 120, the rider can select a mode of a manual operation by the rider using the operating element 113L (a manual operation mode) and a mode of an automatic control using the electric actuator 10 (an automatic control mode). The selection between these modes can be performed by a rider's selection operation on the input unit 40.

In the automatic control mode, the clutch capacity of the clutch device 120 is controlled from a drive transmission disconnected state to a drive transmission connected state when the vehicle 100 starts or when the transmission 109 changes its shift. The control related to the clutch capacity (clutch pressing load/clutch spring load) of the clutch device 120 using the electric actuator 10 will be described.

The clutch device 120 according to the present embodiment is normally in a connected state (clutch capacity: 100%) by the biasing of the clutch spring 126, and it is possible to realize a decrease in clutch capacity (half-clutch state) and a disconnected state (clutch capacity: 0%) by a movement of the lifter shaft 127 according to a rotation of the release operation member 128. Therefore, the clutch capacity is correlated with a torque (or a rotation amount) around the rotation center line X2 of the release operation member 128.

Meanwhile, since the connecting member C, particularly a portion including the inner cables 30a and 31a, is made of an elastic material, the connecting member C extends in proportion to the tensile load in the elastic region. Based on the Hooke's law, the elongation amount of the connecting member C is correlated with the torque around the rotation center line X2 of the release operation member 128, that is, the clutch capacity. When the elongation amount of the connecting member C is defined as L3, L3=operation amount L1-coefficient×rotation amount L2. The coefficient is a coefficient for converting the rotation amount L2 into a movement amount of the end of the connecting member C on the release operation member 128 side, and is set based on, for example, a length of the arm member 16 in the radial direction from the release operation member 128. The operation amount L1 and the rotation amount L2 can be detected by the operation amount sensor 8 and the displacement amount sensor 9. Therefore, it is possible to perform a control to change the clutch capacity of the clutch device 120 based on the detection results of the operation amount sensor 8 and the displacement amount sensor 9.

Figure 6:
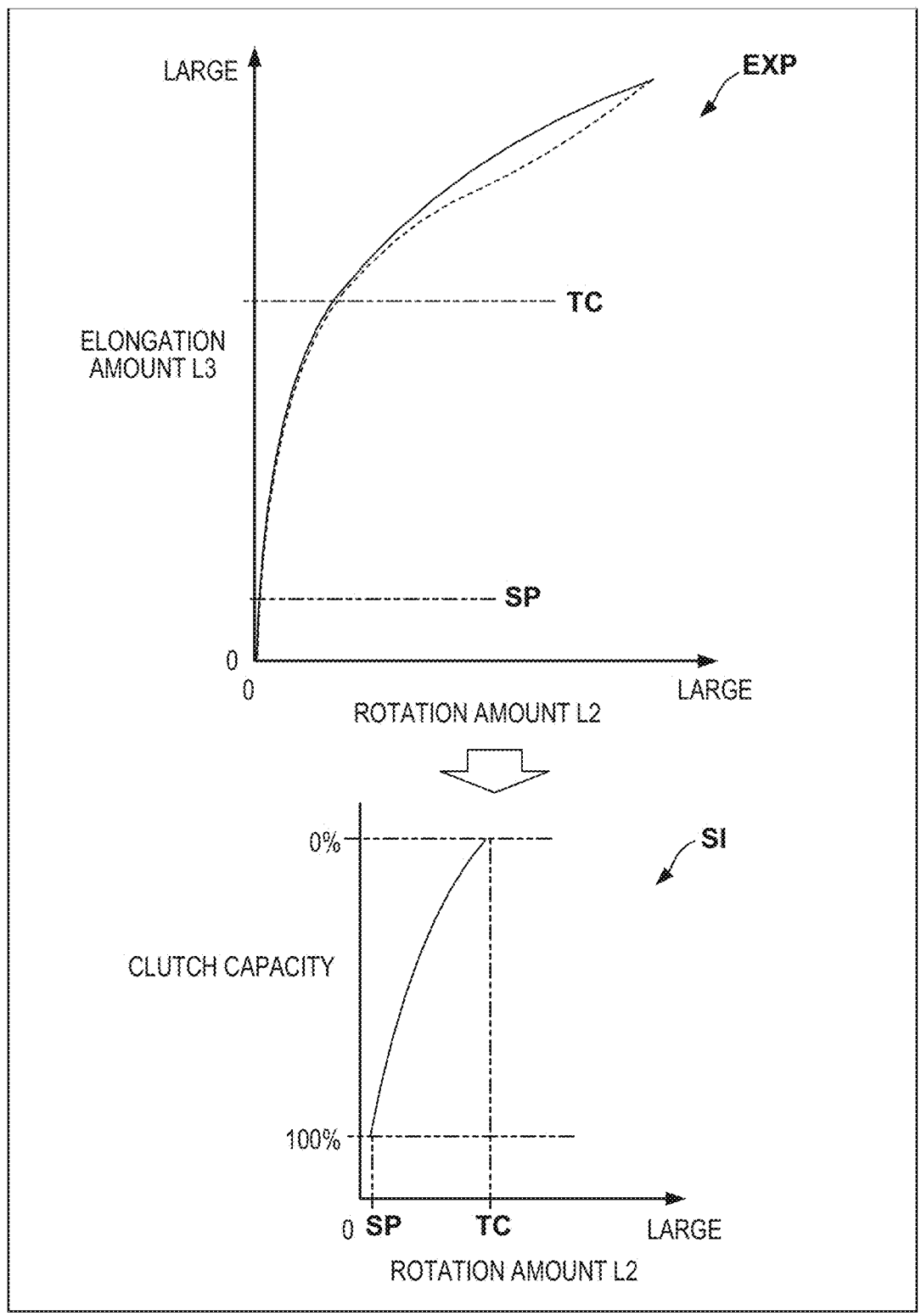
FIG. 6 is a view illustrating examples of test data and characteristic information.

Characteristic information indicating the correlation between the elongation amount L3 and the clutch capacity used for the control of the electric actuator 10 can be obtained by a learning operation in advance. FIG. 6 illustrates examples of test data EXP obtained by the learning operation and characteristic information SI obtained from the test data EXP.

In the learning operation, the electric actuator 10 is driven at least in a range corresponding to a clutch capacity change range (0 to 100%). For example, the electric actuator 10 is driven in such a manner that, in a state where the torque capacity of the clutch device 120 is 100% (it is sufficient that the release operation member 128 is in a free state), the rod 13 is full-stroked in a retracting direction from its initial position, and then returned to the initial position, so that the clutch capacity covers the range of 0% to 100%. An elongation amount L3 is calculated from detection results of the operation amount sensor 8 and the displacement amount sensor 9 during the driving of the electric actuator 10 to obtain test data EXP of FIG. 6.

In the test data EXP, the horizontal axis represents a rotation amount L2 (corresponding to a tensile load of the connecting member C), the vertical axis represents an elongation amount L3, the broken line represents data at the stage of pulling the connecting member C, and the solid line represents data at the stage of releasing the pulling.

From this data, an operation start point SP and a touch point TC are specified. The operation start point SP is a point at which the clutch device 120 shifts from the connected state to the half-clutch state. The operation start point varies depending on the play of the mechanism, etc. The touch point TC is a point at which the clutch device 120 shifts from the disconnected state to the half-clutch state, and varies depending on the wear of the clutch plate 125, etc.

Both the operation start point SP and the touch point TC are specified from an inflection point at which an inclination changes in the test data EXP. For example, at the touch point TC, the change in the elongation amount L3 with respect to the rotation amount L2 slows.

The characteristic information SI indicates an operation start point SP and a touch point TC, and a correlation between a rotation amount L2 and a clutch capacity between the operation start point SP and the touch point TC. The characteristic information SI is stored in, for example, the storage unit 22.

In the above-described control for changing the clutch capacity based on the characteristic information SI, a feedback control of the drive source 11 may be performed while monitoring a detection result of the displacement amount sensor 9 so as to realize a rotation amount L2 corresponding to a target clutch capacity.

Example of Process of Control Unit

An example of a process of the control unit 2 regarding a control of the clutch device 120 will be described. First, the update of the characteristic information SI will be described. The correlation between the elongation amount L3 and the clutch capacity may vary depending on the wear or the like of the mechanism resulting from the use of the vehicle 100. Therefore, it is preferable that the characteristic information SI is not only set by the manufacturer at the time of shipping the vehicle 100, but also automatically updated as needed according to the use of the rider.

Figure 7:
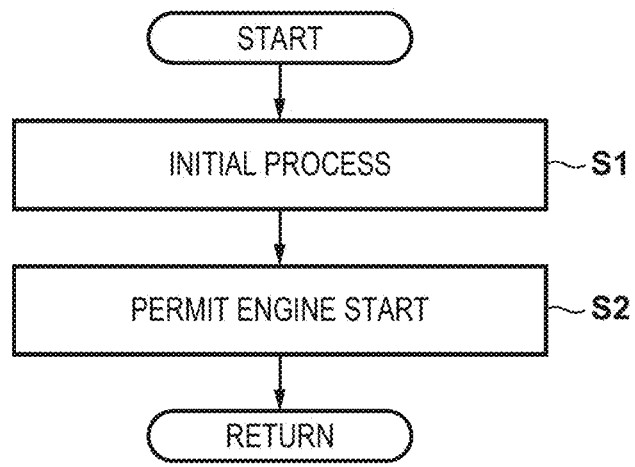
FIG. 7 is a flowchart illustrating an example of a process executed by a control unit of FIG. 3.
Figure 8:
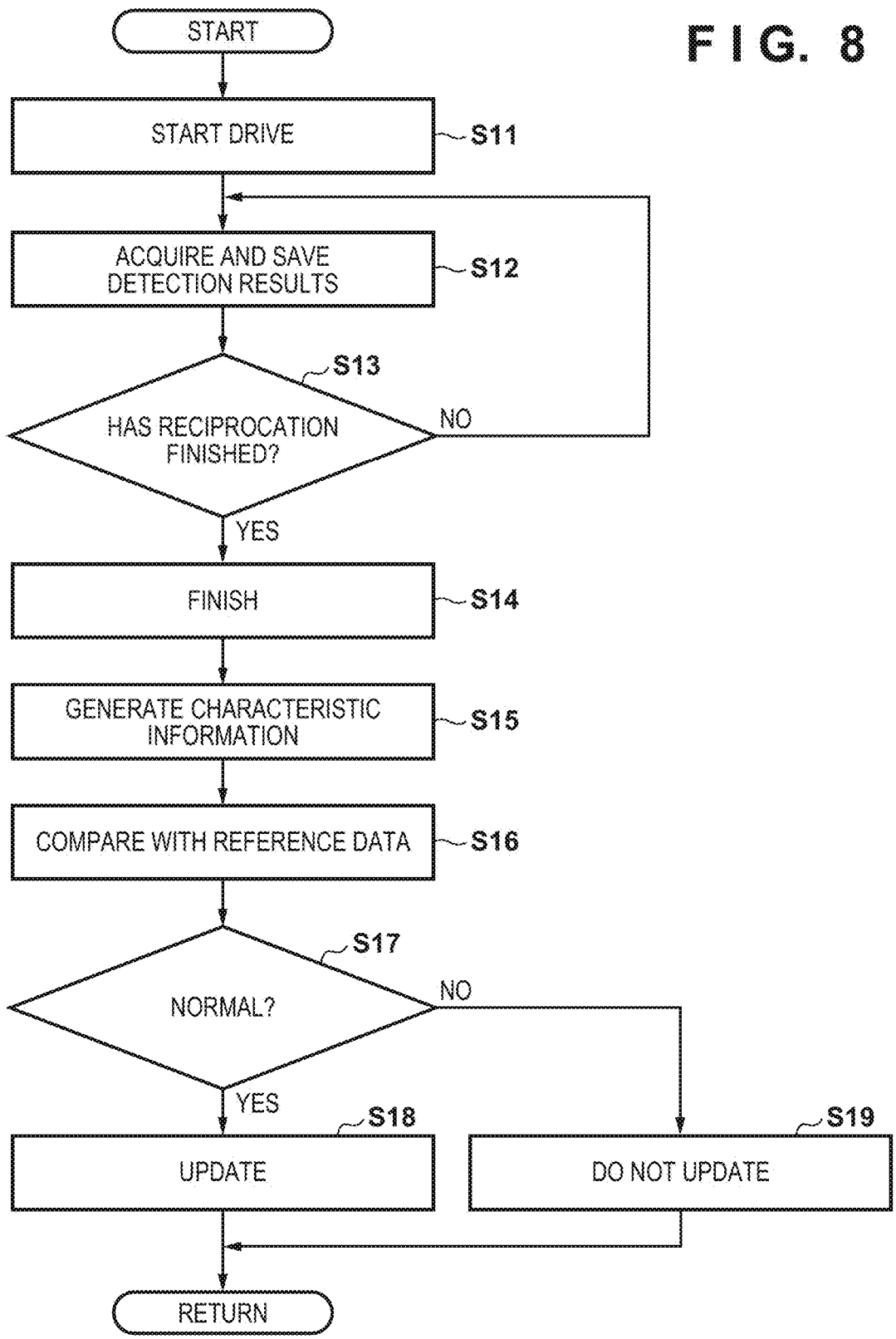
FIG. 8 is a flowchart illustrating an example of a process executed by the control unit of FIG. 3.

In the present embodiment, a process of generating/updating characteristic information SI is executed at the time of activating a control system of the vehicle 100 (at the time of turning on power, which is represented by ignition ON). FIG. 7 is a flowchart illustrating an example of a process executed by the processing unit 21 of the control unit 2 when the power is turned on. In S1, an initial process is performed. Here, the operation of the control device 1 is checked, and the movable part is moved to its initial position. In this initial process, a process of generating/updating characteristic information SI to be described below with reference to FIG. 8 is also performed. When the checking of the operation and the like are normally completed in the initial process of S1, the process proceeds to S2, where permission to start the prime mover 108 is set. When the rider operates a starter button (not illustrated), the prime mover 108 is started.

The process of generating/updating characteristic information SI included in the initial process of S1 will be described with reference to FIG. 8. In S11 to S14, a process related to the learning operation for obtaining the test data EXP exemplified in FIG. 6 is performed. In S11, the driving of the drive source 11 is started. Here, as described above, an operation of full-stroking the rod 13 of the electric actuator 10 in the retracting direction from its initial position, and then returning the rod 13 of the electric actuator 10 to the initial position is started, so that the clutch capacity covers the range of 0% to 100%. In S12, detection results of the operation amount sensor 8 and the displacement amount sensor 9 are acquired.

In S13, it is determined whether the reciprocation of the rod 13 of the electric actuator 10 has finished (whether the rod 13 of the electric actuator 10 has returned to its initial position), and if not, the process returns to S12 to continue to acquire detection results of the operation amount sensor 8 and the displacement amount sensor 9 and move the rod 13. When the reciprocation of the rod 13 has finished, the process proceeds to S14, and the driving of the drive source 11 and the acquisition of the detection results of the operation amount sensor 8 and the displacement amount sensor 9 are finished.

In S15, characteristic information SI is generated from the detection results of the operation amount sensor 8 and the displacement amount sensor 9. Here, for example, in a case where there is a foreign substance that hinders or resists the movement of the rod 13 or the rotation of the release operation member 128 during the learning operation, the accuracy of the characteristic information SI decreases. In addition, the accuracy of the characteristic information SI also decreases when the operating element 113L is operated during the learning operation. In order to exclude an update on characteristic information SI with low accuracy, in S16, the characteristic information SI generated in S15 is compared with reference data, and it is determined whether the characteristic information SI is normal data. The reference data is, for example, data capable of specifying a normal value range for the elongation amount L3 with respect to the clutch capacity, and may be data dedicated for comparison or may be current characteristic information SI (characteristic information SI before being updated) stored in the storage unit 22. When the learning operation is executed, a guide prompting the rider not to perform an operation may be displayed on the display unit 41 so that the rider does not perform an operation on the operating element 113L.

In S17, as a result of the comparison in S16, when the result is normal, the process proceeds to S18, and when the result is abnormal, the process proceeds to S19. In S18, the current characteristic information SI stored in the storage unit 22 is updated with the characteristic information SI generated this time in S15. In S19, no update is performed.

In this manner, the process of generating/updating characteristic information SI ends. Note that the process of S11 to S14 may be performed multiple times, and characteristic information SI may be generated using an average value of detection results of the operation amount sensor 8 and the displacement amount sensor 9.

Figure 9:
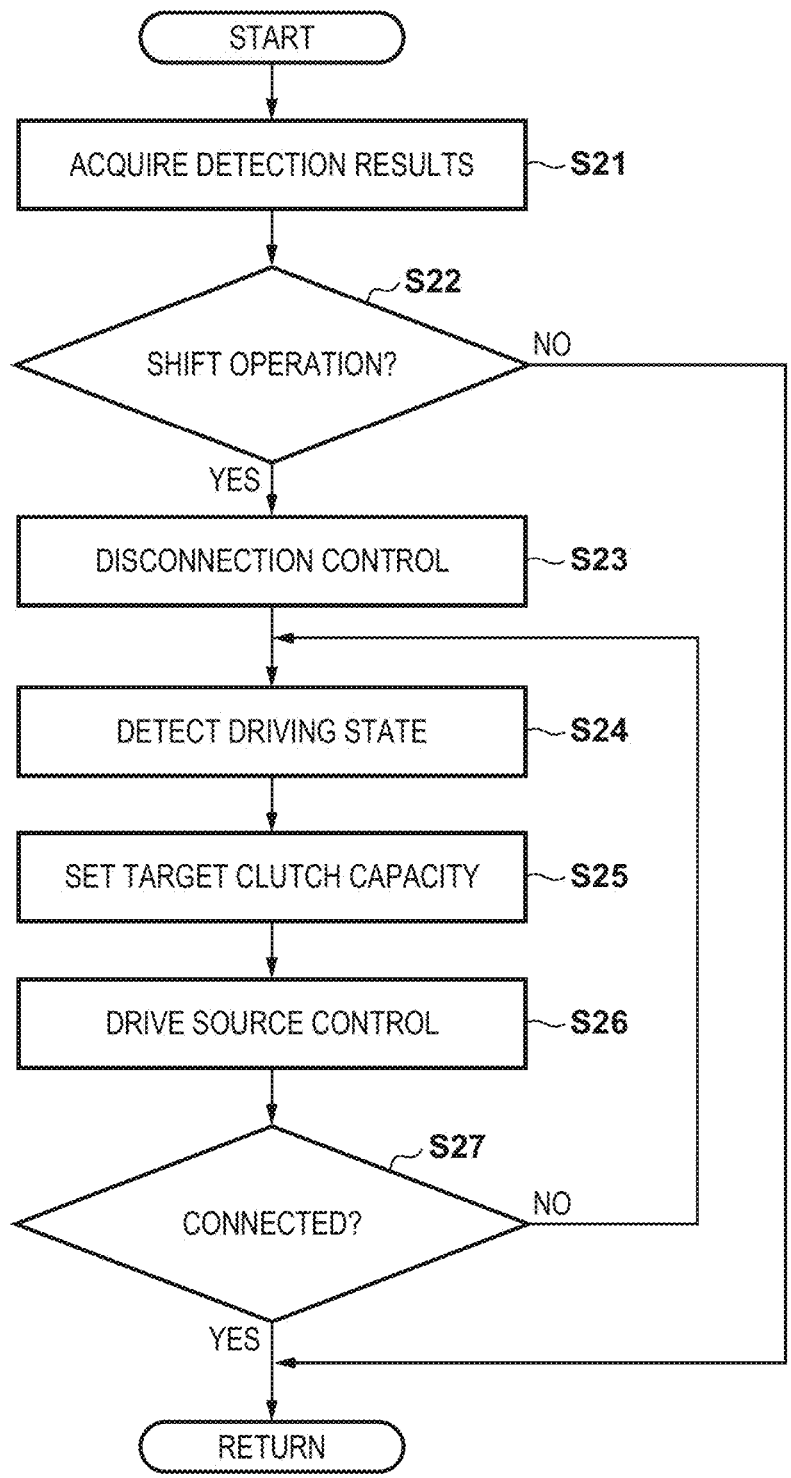
FIG. 9 is a flowchart illustrating an example of a process executed by the control unit of FIG. 3.

FIG. 9 is a flowchart illustrating an example in which the clutch capacity of the clutch device 120 is automatically controlled using the characteristic information SI in the automatic control mode, and illustrates an example of a process executed by the processing unit 21 of the control unit 2. The illustrated process illustrates an example of a process executed when the clutch device 120 is in the connected state.

In S21, a detection result of the shift operation sensor 7 is acquired. In S22, it is determined whether the rider has performed a shift operation on the operating element 115L based on the detection result acquired in S21, and the process proceeds to S23 when it is determined that the shift operation has been performed. In S23, the electric actuator 10 is driven so that the clutch device 120 is in a disconnected state. Here, by reading the characteristic information SI from the storage unit 22, and driving the electric actuator 10 until the rotation amount L2 based on the detection result of the displacement amount sensor 9 becomes larger than the rotation amount L2 corresponding to the touch point TC, the clutch device 120 can be reliably shifted to the disconnected state.

S24 to S25 relate to a process of shifting the clutch device 120 to the connected state after a shift operation. In S24, a driving state of the vehicle 100 is detected. Here, detection results of the throttle opening sensor 3, the engine speed sensor 4, the shift position sensor 5, and the vehicle speed sensor 6 are acquired. In S25, a target value of a clutch capacity of the clutch device 120 is set based on the detection results acquired in S24. In S26, the drive control of the electric actuator 10 (the drive source 11) is performed so as to achieve the target value of the clutch capacity set in S25. Here, the characteristic information SI is read from the storage unit 22, the detection result of the displacement amount sensor 9 is monitored, and the feedback control of the drive source 11 is performed so that the rotation amount L2 becomes the rotation amount L2 corresponding to the target value of the clutch capacity set in S25.

In S27, it is determined whether or not the clutch device 120 has been shifted to the connected state (whether or not the clutch capacity is 100%), and when the clutch device has not been shifted to the connected state, the process returns to S24 and the similar process is repeated. When the clutch device 120 has been shifted to the connected state, the process ends. Through the above-described process, it is possible to automatically control the connection and disconnection of the clutch device 120 at the time of the shift change of the rider, and it is possible to realize a semi-automatic transmission system.

Figure 10:
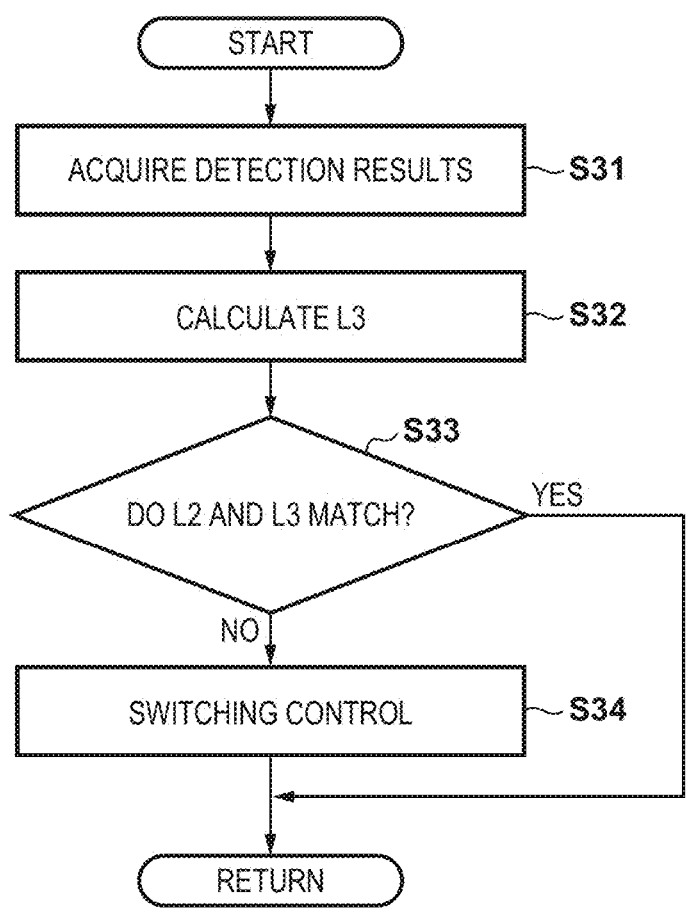
FIG. 10 is a flowchart illustrating an example of a process executed by the control unit of FIG. 3.

FIG. 10 illustrates an example of a process related to an intervention of a manual operation of the rider in the automatic control mode, and repeatedly executed in parallel, for example, during the drive control of the electric actuator 10 in S26. When a manual operation of the rider through the operating element 113L intervenes during the automatic control of the clutch device 120, the automatic control mode is terminated and the automatic control mode is switched to the manual operation mode in the present embodiment. When a manual operation of the rider intervenes, the rotation amount L2 of the release operation member 128 with respect to the operation amount L1 of the electric actuator 10 becomes larger than usual. Accordingly, it is possible to determine that the manual operation of the rider has intervened from the detection results of the operation amount sensor 8 and the displacement amount sensor 9.

In S31, detection results of the operation amount sensor 8 and the displacement amount sensor 9 are acquired. In S32, an elongation amount L3 is calculated from the detection results acquired in S31. In S33, it is determined whether or not the rotation amount L2 detected by the displacement amount sensor 9 matches the elongation amount L3 calculated in S32. This determination can be performed using, for example, the test data EXP of FIG. 6, and the test data EXP may be stored in the storage unit 22 for this determination. Then, for example, when a difference between the rotation amount L2 corresponding to the elongation amount L3 calculated in S32 on the test data EXP and the rotation amount L2 detected in S31 exceeds a threshold value, it can be determined that there is an intervention of a manual operation of the rider.

In the determination of S33, when it is determined that the rotation amount L2 detected by the displacement amount sensor 9 matches the elongation amount L3 calculated in S32, it is determined that there is no intervention of a manual operation of the rider and the process ends, and when it is determined that the rotation amount L2 detected by the displacement amount sensor 9 does not match the elongation amount L3 calculated in S32, it is determined that there is an intervention of a manual operation of the rider and the process proceeds to S34. In S34, the automatic control mode is canceled, and the control mode of the clutch device 120 is switched from the automatic control mode to the manual operation mode.

When the automatic control mode is suddenly switched to the manual operation mode, the burden of operating the operating element 113L may suddenly increase, which may cause the rider to feel uncomfortable. In the switching control, for example, the electric actuator 10 is driven so that the operation amount L1 gradually decreases. In addition, the switching of the control mode may be notified to the rider in a displayed manner using the display unit 41.

As described above, in the present embodiment, by adopting the configuration in which the release operation member 128 is operated by the electric actuator 10 through the connecting member C, the control device 1 can be configured by utilizing the conventional manual-type clutch device 120 almost as is, and adding the electric actuator 10 and the sensors 8 and 9 outside the clutch device 120. Therefore, the automatic control of the clutch device 120 can be realized with a relatively simple configuration. Since the clutch capacity can be estimated from the elongation amount of the connecting member C, the control of the clutch capacity can also be realized with a relatively simple configuration. Since the clutch device 120 and the electric actuator 10 can be arranged to be separated from each other through the connecting member C, the degree of freedom in arranging the electric actuator 10 can also be improved. In the case where the connecting member C is bendable with flexibility, the degree of freedom in arranging the electric actuator 10 can be further improved. By generating the characteristic information SI, an automatic control corresponding to an individual difference in the clutch device 120 and the like can be performed. Furthermore, by appropriately updating the characteristic information SI, an automatic control of the clutch device 120 corresponding to a deterioration of the vehicle 100 over time can also be performed. Since an intervention of a manual operation of the rider can be determined by utilizing detection results of the sensors 8 and 9 in the automatic control mode, a clutch control can be performed according to an intention of the rider.

Second Embodiment

In the first embodiment, the release operation member 128 is operated by an operation input of the electric actuator 10 and a manual operation input of the rider with respect to the operating element 113L using the transmission mechanism 18 having a cancellation mechanism. However, other configurations can be adopted.

Figure 11:
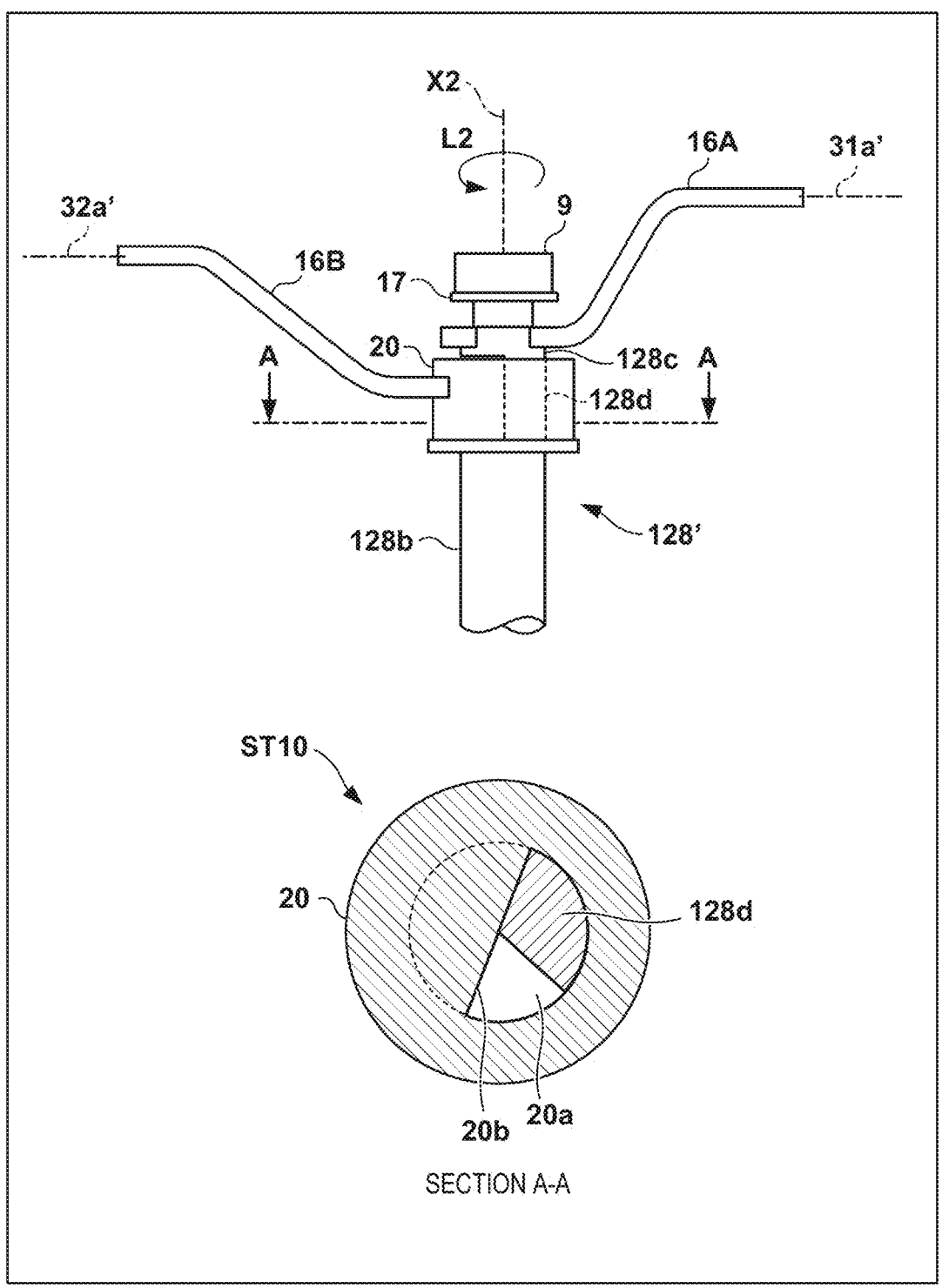
FIG. 11 is a view illustrating another configuration example of a release operation member and its peripheral structure.

FIG. 11 is an explanatory view illustrating a release operation member 128' replacing the release operation member 128 and its peripheral structure, and is a cross-sectional view taken along line A-A of the explanatory view.

The release operation member 128' is a single integrated shaft member formed by vertically connecting a lower member 128b and an upper member 128c to each other. The release operation member 128' has a basic structure similar to that of the release operation member 128, and is rotatably supported by the clutch cover 120a. The lower member 128b has an eccentric cam portion 128a (not illustrated) similar to that of the release operation member 128. A displacement amount (rotation amount) of the release operation member 128' is detected by the displacement amount sensor 9.

An arm member 16A replacing the arm member 16 is fixed to the upper member 128c, and the arm member 16A and the electric actuator 10 are connected to each other through a connecting member 31a'. The operating element 113L is not connected to the arm member 16A. The arm member 16A protrudes in the radial direction from the release operation member 128'. The connecting member 31a' is, for example, a metal wire. By driving the electric actuator 10, the release operation member 128' can be rotated through the connecting member 31a' and the arm member 16A.

An arm member 16B replacing the arm member 16 is attached to the release operation member 128'. That is, in the present embodiment, the arm member 16A for the electric actuator 10 and the arm member 16B for manual operation through the operating element 113L are separately provided. The arm member 16B is connected to the operating element 113L through a cable 32a', and the cable 32a' is, for example, a metal wire. The arm member 16B protrudes in the radial direction from the release operation member 128', but protrudes in a direction different from that of the arm member 16A in a circumferential direction of the release operation member 128'. The rider can rotate the release operation member 128' through the operating element 113L, the connecting member 32a', and the arm member 16B.

The arm member 16B has a hollow attachment portion 20. As illustrated in the cross-sectional view, the inside of the attachment portion 20 has a through hole 20a having a substantially semicircular cross-sectional shape and an engagement portion 20b defining a side surface of the through hole 20a. An engagement portion 128d of the upper member 128c is inserted into the through hole 20a. The engagement portion 128d is a rod-shaped portion having a fanlike cross-sectional shape.

Figure 12:
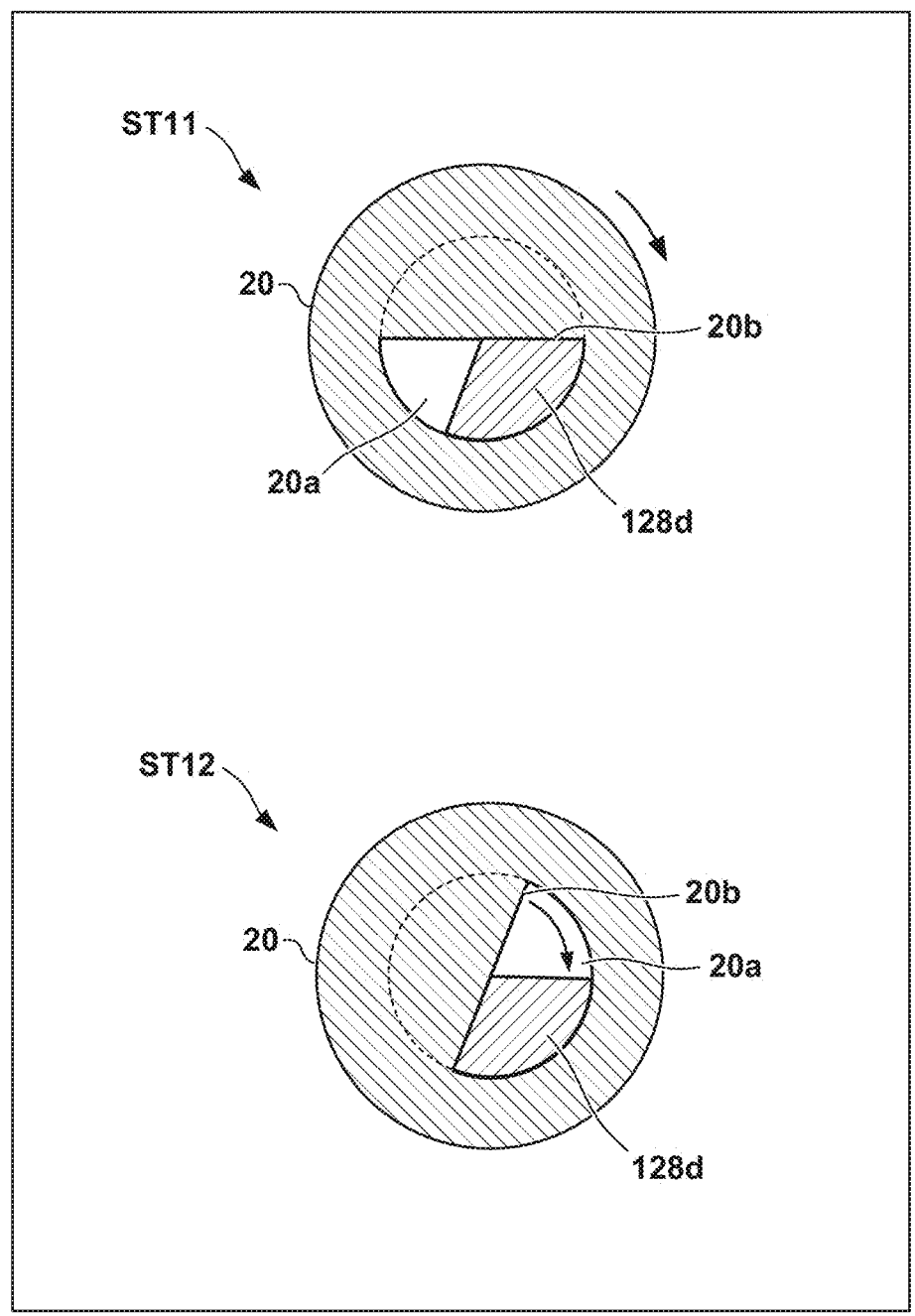
FIG. 12 is an explanatory view of the configuration example of FIG. 11.

The arm member 16B is attached to the release operation member 128' in the attachment portion 20 so as to be relatively rotatable coaxially with the release operation member 128' (about the rotation center line X2) within a radial gap between the through hole 20a and the engagement portion 128d. With this configuration, a cancellation mechanism is formed on the manual operation side. FIG. 12 is an explanatory diagram thereof.

When the rider operates the operating element 113L with a state ST10 of FIG. 11 as an initial position, the arm member 16B rotates to reach a state ST11 of FIG. 12. Since the engagement portion 20b and the engagement portion 128d are in an engaged state, the release operation member 128' also rotates in conjunction with the rotation of the arm member 16B.

On the other hand, when the electric actuator 10 is driven with the state ST10 of FIG. 11 as an initial position, the release operation member 128' rotates together with the arm member 16A and reaches a state ST12 of FIG. 12. Since the engagement portion 20b and the engagement portion 128d are not engaged with each other in the state ST12, even if the rider operates the operating element 113L and the arm member 16B rotates thereafter, the release operation member 128' does not rotate. That is, the manual operation of the rider is canceled. In this manner, it is possible to cancel the manual operation through the operating element 113L that overlaps with the operation by the electric actuator 10.

Figure 13:
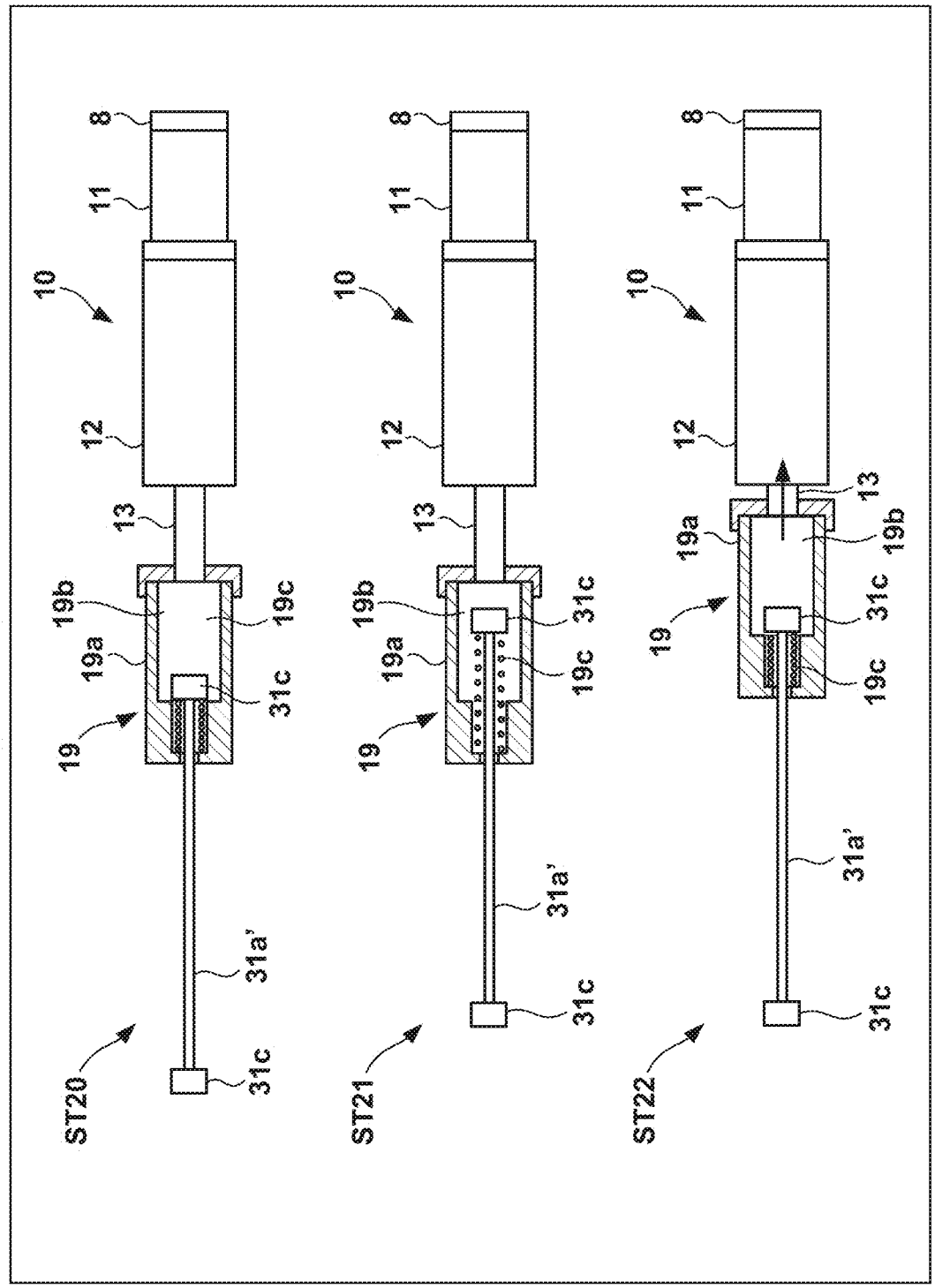
FIG. 13 is an explanatory view of an operation of a transmission mechanism.

FIG. 13 illustrates an example of a mechanism that cancels an operation on the electric actuator 10 side. A transmission mechanism 19 is provided between the rod 13 and the connecting member 31a'. In the transmission mechanism 19, an engagement portion 31c at an end portion of the connecting member 31a' and an elastic member 19c are incorporated in an internal space 19b of a cylindrical case 19a. The elastic member 19c is a coil spring in the illustrated example, is loaded between the engagement portion 31c and an inner wall surface of the case 19a, and generates a biasing force in a direction in which the connecting member 31a' is pulled toward the electric actuator 10.

A state ST20 of FIG. 13 illustrates an initial state corresponding to the initial position of the state ST10 of FIG. 11. In this state, when the rider operates the operating element 113L to reach the state ST11 of FIG. 12, on the electric actuator 10 side, the connecting member 31a' moves toward the electric actuator 10 as illustrated in a state ST21 of FIG. 13. Since the elastic member 19c generates the biasing force in the direction in which the connecting member 31a' is pulled toward the electric actuator 10, this contributes to reducing an operating force with which the rider operates the operating element 113L. Further, since the engagement portion 31c is separated from the inner wall surface of the case 19a, even if the electric actuator 10 is driven in this state, the connecting member 31a' is hardly moved in the pulling direction, and the operation of the electric actuator 10 is canceled. In this manner, it is possible to cancel the operation by the electric actuator 10 overlapping with the manual operation through the operating element 113L.

A state ST22 of FIG. 13 illustrates an example in which the electric actuator 10 is driven from the state ST20 to move the connecting member 31a' in the pulling direction, and the release operation member 128' reaches the state ST12 of FIG. 12.

As described above, in the configuration of the present embodiment as well, while the release operation member 128' can be operated by an operation input of the electric actuator 10 and a manual operation input of the rider with respect to the operating element 113L, an overlapping operation (an operation corresponding to a displacement amount of the release operation member 128') can be canceled.

Figure 14:
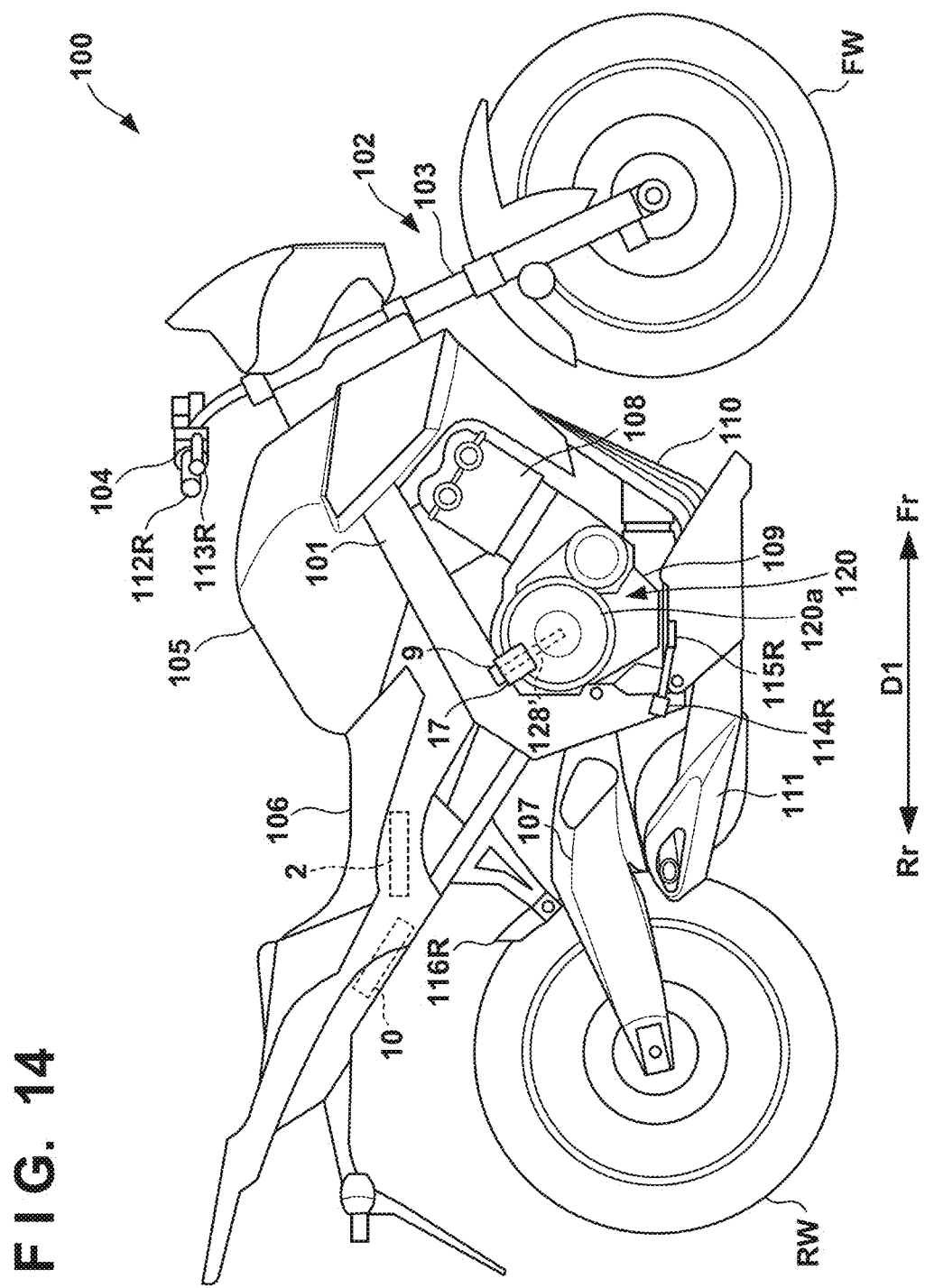
FIG. 14 is a view illustrating another arrangement example of an electric actuator.

In the present embodiment, since the arm member 16A and the arm member 16B protrude in different directions in the circumferential direction of the release operation member 128', the degree of freedom in routing the connecting member 31a' and the cable 32a' is improved, and as a result, the degree of freedom in arranging the electric actuator 10 is also improved. FIG. 14 illustrates one example thereof. In the illustrated example, the electric actuator 10 is disposed at a rear portion of the vehicle 100 (below a rear portion of the seat 106). In this manner, a layout in which the operating element 113L (not illustrated in FIG. 14) and the electric actuator 10 are arranged at positions opposite each other with respect to the release operation member 128' in the D1 direction can also be adopted.

Third Embodiment

Figure 15:
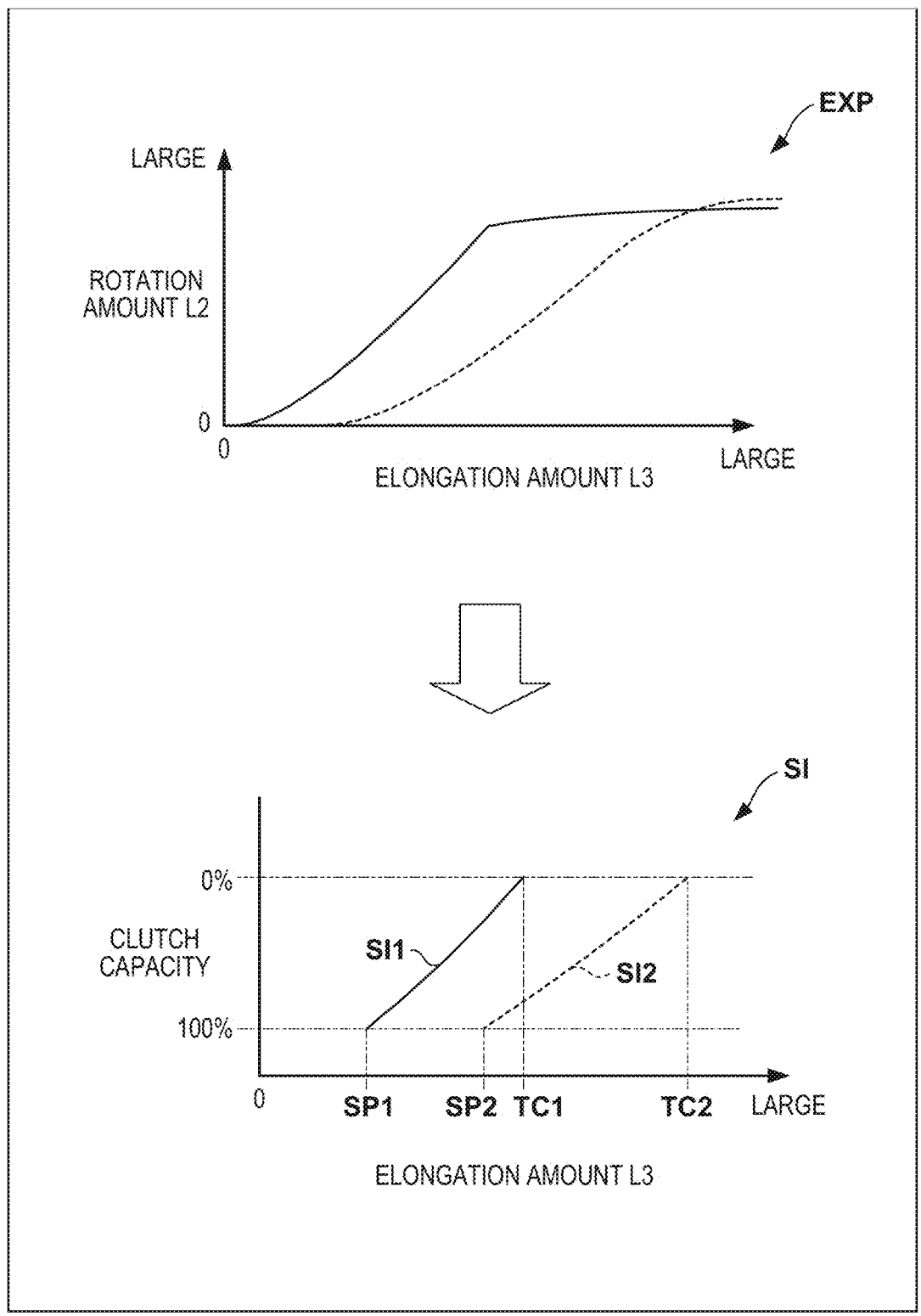
FIG. 15 is a view illustrating another example of characteristic information.

The characteristic information SI in FIG. 6 is information indicating a correlation between a clutch capacity and a rotation amount L2, but the characteristic information SI may be information indicating a correlation between a clutch capacity and an elongation amount L3. Hysteresis characteristics of the connecting member C1 may be considered. FIG. 15 illustrates examples of test data EXP and characteristic information SI in the present embodiment.

In a case where the connecting member C1 is a metal wire, an elongation amount thereof has hysteresis characteristics at the time of elongation and at the time of restoration. In the learning operation, as in the first embodiment, the electric actuator 10 is driven at least in a range corresponding to a clutch capacity change range (0 to 100%). For example, the electric actuator 10 is driven in such a manner that, in a state where the torque capacity of the clutch device 120 is 100% (it is sufficient that the release operation member 128 is in a free state), the rod 13 is full-stroked in a retracting direction from its initial position, and then returned to the initial position, so that the clutch capacity covers the range of 0% to 100%. An elongation amount L3 is calculated from detection results of the operation amount sensor 8 and the displacement amount sensor 9 during the driving of the electric actuator 10 to obtain test data EXP of FIG. 15.

In the test data EXP, the vertical axis represents a rotation amount L2 (corresponding to a tensile load of the connecting member C1), the horizontal axis represents an elongation amount L3, the broken line represents data at the stage of pulling the connecting member C1, and the solid line represents data at the stage of releasing the pulling.

The characteristic information SI is obtained from the data. An operation start point and a touch point are specified from an inflection point or the like of the inclination of each type of data.

The characteristic information SI includes characteristic information SI1 and characteristic information SI2. The characteristic information SI2 is control information used when the clutch device 120 is shifted from a connected state to a disconnected state, and is control information used when the connecting member C1 is pulled by the electric actuator 10. The characteristic information SI2 includes an operation start point SP2 and a touch point TC2, and a correlation between an elongation amount L3 and a clutch capacity between the operation start point SP2 and the touch point TC2.

The characteristic information SI1 is control information used when the clutch device 120 is shifted from the disconnected state to the connected state, and is control information used when the connecting member C1 pulled by the electric actuator 10 is sent back and returned to its original length. The characteristic information SI1 includes an operation start point SP1 and a touch point TC1, and a correlation between an elongation amount L3 and a clutch capacity between the operation start point SP1 and the touch point TC1. The characteristic information SI is stored in, for example, the storage unit 22.

In the above-described control for changing the clutch capacity based on the characteristic information SI, a feedback control of the drive source 11 may be performed while monitoring detection results of the operation amount sensor 8 and the displacement amount sensor 9 so as to realize an elongation amount L3 corresponding to a target clutch capacity.

Concerning the process of FIG. 9 in a case where the characteristic information SI is configured as in the present embodiment, the difference from the first embodiment will be described. In S23, the characteristic information SI2 out of the two types of characteristic information SI1 and SI2 is read from the storage unit 22. Then, by driving the electric actuator 10 until the elongation amount L3 of the connecting member C1 based on the detection results of the operation amount sensor 8 and the displacement amount sensor 9 becomes longer than the elongation amount L3 corresponding to the touch point TC2, the clutch device 120 can be reliably shifted to the disconnected state.

In S26, the characteristic information SI1 is read from the storage unit 22, the detection results of the operation amount sensor 8 and the displacement amount sensor 9 are monitored, and the feedback control of the drive source 11 is performed so that the elongation amount L3 of the connecting member C1 becomes the elongation amount L3 corresponding to the target value of the clutch capacity set in S25.

The same applies to the matching determination in S33 of FIG. 10. In the matching determination, for example, the test data EXP of FIG. 15 may be used, in which the data indicated by the solid line and the data indicated by the broken line are distinguished between when the connecting member C1 is pulled and when the connecting member C1 is returned.

In this manner, the characteristic information SI may be configured as information indicating a correlation between a clutch capacity and an elongation amount L3, and the hysteresis characteristic of the elongation of the connecting member C1 can also be considered.

OTHER EMBODIMENTS

In the clutch device 120 according to the above-described embodiment, the release operation member 128 is configured to change the clutch capacity by its rotational movement, but the release operation member 128 may be configured to change the clutch capacity by moving the lifter shaft 127 in the D3 direction by its translational movement in the D3 direction.

Summary of Embodiments

The above-described embodiments disclose at least the following control device.

1. The control device (1) of the embodiment is a control device (1) for automatically controlling a clutch device (120) disposed on a path along which a driving force output from a prime mover (108) is transmitted, the clutch device being configured to connect or disconnect transmission of the driving force according to a manual operation of an operator with respect to a clutch operating element (113L), the control device comprising:
   a connecting member (C) connected to a release operation member (128) of the clutch device (120);
   an electric actuator (10) configured to displace the release operation member (128) through the connecting member (C);
   a control unit (2) configured to displace the release operation member (128) by driving the electric actuator (10) so as to change a clutch capacity of the clutch device (120);
   a first sensor (8) configured to detect an operation amount (L1) of the electric actuator (10) with respect to the connecting member (C); and
   a second sensor (9) configured to detect a displacement amount (L2) of the release operation member (128),
   wherein the control unit (2) is configured to determine (S31-S33) whether or not there is an intervention of the manual operation by the operator through the clutch operating element based on each detection result of the first sensor (8) and the second sensor (9) during an automatic control of the clutch device (120) by the electric actuator (10).

According to this embodiment, it is possible to provide a control device capable of realizing an automatic control of a clutch device with a relatively simple configuration. By determining an intervention of a manual operation of an operator during the automatic control, it is possible to perform a clutch control according to an intention of the operator.

2. The control device of the embodiment further comprises:
   a cancellation mechanism (FIGS. 5, and 11 to 13) configured to cancel an operation corresponding to a displacement amount overlapping between the manual operation and the operation by the electric actuator (10) with respect to the release operation member (128, 128').

According to this embodiment, it is possible to prevent the manual operation and the operation by the electric actuator from being weighted.

3. The control device of the embodiment further comprises:
   a first cable (30*a*);
   a second cable (31*a*); and
   a transmission mechanism (18) provided between the first cable and the second cable,
   wherein the transmission mechanism (18) includes:
   a movable element (181) engaged with the first cable (30*a*) and the second cable (31*a*); and
   a support member (180) for supporting the movable element (181) so that the movable element is movable,
   the first cable (30*a*) is connected to the release operation member (128),
   the second cable (31*a*) is connected to the electric actuator (10),
   the connecting member (C) includes the first cable (30*a*), the second cable (31*a*), and the movable element (181),
   a third cable (32*a*) connected to the clutch operating element (128) is engaged with the movable element, and
   the release operation member (128) is
   displaced by a driving force of the electric actuator (10) transmitted through the first cable (30*a*), the movable element (181), and the second cable (31*a*), and
   displaced by an operating force on the clutch operating element (113L) transmitted through the first cable (30*a*), the movable element (181), and the third cable (32*a*).

According to this embodiment, inputs of two systems can be output in one system in an integrated manner with a relatively simple structure, and both a manual operation and an automatic operation can be achieved.

4. In the embodiment, the transmission mechanism (18) is fixed to a clutch cover (120*a*) of the clutch device (120).

According to this embodiment, the transmission mechanism can be arranged in a relatively compact manner.

5. In the embodiment, the release operation member (128') is a shaft member rotatably supported,
   the connecting member (31*a*') connects a first arm member (16A) protruding from the release operation member (128') in a radial direction of the release operation member (128') and the electric actuator (10),
   the clutch operating element (113L) is connected to a second arm member (16B) protruding from the release operation member (128') in the radial direction of the release operation member (128') through a cable (32*a*'), and
   the release operation member (128') is
   rotated by a driving force of the electric actuator (10) transmitted through the connecting member (31*a*') and the first arm member (16A), and
   rotated by an operating force on the clutch operating element (113L) transmitted through the cable (32*a*') and the second arm member (16B).

According to this embodiment, the release operation member can be operated by inputs of two systems with a relatively simple structure, and both a manual operation and an automatic operation can be achieved. A degree of freedom in arranging the electric actuator can be improved.

6. In the embodiment, the first arm member (16A) is fixed to the release operation member (128'),
   the second arm member (16B) is attached to the release operation member (128') so as to be rotatable coaxially with the release operation member (128'), and
   when a first engagement portion (20*b*) of the second arm member (16B) and a second engagement portion (128*d*) of the release operation member (128') are in an engaged state, the second arm member (16B) and the release operation member (128') rotate in conjunction with each other.

According to this embodiment, it is possible to prevent the manual operation and the operation by the electric actuator from being weighted.

7. In the embodiment, the clutch device (120) is disposed between an internal combustion engine (108) and a transmission (109) in a straddle type vehicle (100) to connect or disconnect transmission of a driving force of the internal combustion engine (108) to the transmission (109), and the clutch operating element (113L) and the electric actuator (10) are disposed at positions opposite each other with respect to the release operation member (128') in a front-and-rear direction (D1) of the straddle type vehicle (100).

According to this embodiment, it is also possible to utilize a space having a relatively small number of components as a location for arranging the electric actuator.

8. In the embodiment, the control unit (2) is configured to stop the automatic control when it is determined that there is the intervention of the manual operation during the automatic control (S34).

According to this embodiment, it is possible to perform a clutch control according to an intention of the operator.

9. In the embodiment, the control unit (2) is configured to control the electric actuator during the automatic control based on information (SI) indicating a relationship between the clutch capacity and a difference between the operation amount and the displacement amount, and each detection result of the first sensor (8) and the second sensor (9).

According to this embodiment, a clutch capacity can be controlled by monitoring an elongation amount of the connecting member.

10. In the embodiment, the control unit (2) is configured to control the electric actuator (10) during the automatic control based on information (SI) indicating a relationship between the clutch capacity and the displacement amount of the release operation member (128), and the detection result of the second sensor.

According to this embodiment, a clutch capacity can be controlled by monitoring the displacement amount of the release operation member.

While an embodiment has been described, the invention is not limited to the foregoing embodiments, and various variations/changes are possible within the spirit of the invention.

What is claimed is:

1. A control device for automatically controlling a clutch device disposed on a path along which a driving force output from a prime mover is transmitted, the clutch device being configured to connect or disconnect transmission of the driving force according to a manual operation of an operator with respect to a clutch operating element, the control device comprising:
   a connecting member connected to a release operation member of the clutch device;
   an electric actuator configured to displace the release operation member through the connecting member;
   a control unit configured to displace the release operation member by driving the electric actuator so as to change a clutch capacity of the clutch device;
   a first sensor configured to detect an operation amount of the electric actuator with respect to the connecting member; and
   a second sensor configured to detecting a displacement amount of the release operation member,
   wherein the control unit is configured to determine whether or not there is an intervention of the manual operation by the operator through the clutch operating element based on each detection result of the first sensor and the second sensor during an automatic control of the clutch device by the electric actuator.

2. The control device according to claim 1, further comprising:
   a cancellation mechanism configured to cancel an operation corresponding to a displacement amount overlapping between the manual operation and the operation by the electric actuator with respect to the release operation member.

3. The control device according to claim 1, further comprising:
   a first cable;
   a second cable; and
   a transmission mechanism provided between the first cable and the second cable,
   wherein the transmission mechanism includes:
   a movable element engaged with the first cable and the second cable; and
   a support member configured to support the movable element so that the movable element is movable,
   the first cable is connected to the release operation member,
   the second cable is connected to the electric actuator,
   the connecting member includes the first cable, the second cable, and the movable element,
   a third cable connected to the clutch operating element is engaged with the movable element, and
   the release operation member is
   displaced by a driving force of the electric actuator transmitted through the first cable, the movable element, and the second cable, and
   displaced by an operating force on the clutch operating element transmitted through the first cable, the movable element, and the third cable.

4. The control device according to claim 3, wherein the transmission mechanism is fixed to a clutch cover of the clutch device.

5. The control device according to claim 1, wherein
   the release operation member is a shaft member rotatably supported,
   the connecting member connects a first arm member protruding from the release operation member in a radial direction of the release operation member and the electric actuator,
   the clutch operating element is connected to a second arm member protruding from the release operation member in the radial direction of the release operation member through a cable, and
   the release operation member is
   rotated by a driving force of the electric actuator transmitted through the connecting member and the first arm member, and
   rotated by an operating force on the clutch operating element transmitted through the cable and the second arm member.

6. The control device according to claim 5, wherein
   the first arm member is fixed to the release operation member,
   the second arm member is attached to the release operation member so as to be rotatable coaxially with the release operation member, and
   when a first engagement portion of the second arm member and a second engagement portion of the release operation member are in an engaged state, the second arm member and the release operation member rotate in conjunction with each other.

7. The control device according to claim 6, wherein the clutch device is disposed between an internal combustion engine and a transmission in a straddle type vehicle to connect or disconnect transmission of a driving force of the internal combustion engine to the transmission, and the clutch operating element and the electric actuator are disposed at positions opposite each other with respect to the release operation member in a front-and-rear direction of the straddle type vehicle.

8. The control device according to claim 1, wherein the control unit is configured to stop the automatic control when it is determined that there is the intervention of the manual operation during the automatic control.

9. The control device according to claim 1, wherein the control unit is configured to control the electric actuator during the automatic control based on information indicating a relationship between the clutch capacity and a difference between the operation amount and the displacement amount, and each detection result of the first sensor and the second sensor.

10. The control device according to claim 1, wherein the control unit is configured to control the electric actuator during the automatic control based on information indicating a relationship between the clutch capacity and the displacement amount of the release operation member, and the detection result of the second sensor.

* * * * *